(12) United States Patent
Li

(10) Patent No.: US 12,630,464 B2
(45) Date of Patent: *May 19, 2026

(54) GLASS COMPOSITIONS, FIBERIZABLE GLASS COMPOSITIONS, AND GLASS FIBERS MADE THEREFROM

(71) Applicant: Electric Glass Fiber America, LLC, Shelby, NC (US)

(72) Inventor: Hong Li, Stanley, NC (US)

(73) Assignee: Electric Glass Fiber America, LLC, Shelby, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,165

(22) Filed: May 10, 2024

(65) Prior Publication Data

US 2024/0300849 A1 Sep. 12, 2024

Related U.S. Application Data

(63) Continuation of application No. 17/357,214, filed on Jun. 24, 2021, now Pat. No. 12,006,256.

(60) Provisional application No. 63/043,874, filed on Jun. 25, 2020.

(51) Int. Cl.
| | |
|---|---|
| *C03C 13/00* | (2006.01) |
| *C03B 37/01* | (2006.01) |
| *C03C 3/087* | (2006.01) |
| *C03C 3/093* | (2006.01) |
| *C03C 3/095* | (2006.01) |
| *C08J 5/04* | (2006.01) |
| *D03D 15/267* | (2021.01) |
| *D04H 3/004* | (2012.01) |

(52) U.S. Cl.
CPC .............. *C03C 3/095* (2013.01); *C03B 37/01* (2013.01); *C03C 3/087* (2013.01); *C03C 3/093* (2013.01); *C03C 13/00* (2013.01); *C08J 5/043* (2013.01); *D03D 15/267* (2021.01); *D04H 3/004* (2013.01); *D10B 2101/06* (2013.01); *D10B 2501/04* (2013.01)

(58) Field of Classification Search
CPC ......... C03C 3/087; C03C 3/091; C03C 3/093; C03C 3/095; C03C 13/00; C03C 13/06; D03D 15/267; D04H 3/004; D10B 2101/06; D10B 2501/04
See application file for complete search history.

(56) References Cited

U.S. PATENT DOCUMENTS

| | | | |
|---|---|---|---|
| 4,542,106 | A | 9/1985 | Sproull |
| 5,789,329 | A | 8/1998 | Eastes et al. |
| 6,818,575 | B2 | 11/2004 | Wallenberger |
| 9,944,551 | B2 | 4/2018 | Li |
| 9,957,191 | B2 | 5/2018 | Li et al. |
| 10,035,727 | B2 | 7/2018 | Li et al. |
| 10,065,883 | B2 | 9/2018 | Li et al. |
| 12,006,256 | B2 | 6/2024 | Li |
| 2011/0236684 | A1 | 9/2011 | Teschner et al. |
| 2015/0018194 | A1 | 1/2015 | Li et al. |
| 2018/0208498 | A1 | 7/2018 | Li et al. |
| 2018/0208499 | A1 | 7/2018 | Li |
| 2019/0039945 | A1 | 2/2019 | Li et al. |
| 2019/0276349 | A1 | 9/2019 | Li |
| 2020/0165158 | A1 | 5/2020 | Korwin-Edson |
| 2020/0165159 | A1 | 5/2020 | Korwin-Edson |

FOREIGN PATENT DOCUMENTS

| | | |
|---|---|---|
| CN | 105693100 A | 6/2016 |
| CN | 106795040 A | 5/2017 |
| CN | 111936440 A | 11/2020 |
| EP | 3354628 A1 | 8/2018 |
| EP | 2630094 B1 | 7/2020 |
| JP | 2017526607 A | 9/2017 |
| RU | 2513903 C1 | 4/2014 |
| WO | 2013036736 A2 | 3/2013 |
| WO | 2014062715 A1 | 4/2014 |
| WO | 2016040425 A1 | 3/2016 |
| WO | 2019173360 A1 | 9/2019 |

OTHER PUBLICATIONS

U.S. Appl. No. 15/926,519 , "Corrected Notice of Allowability", Oct. 1, 2020, 2 pages.
U.S. Appl. No. 17/357,214 , "Advisory Action", Nov. 30, 2023, 3 pages.
U.S. Appl. No. 17/357,214 , "Final Office Action", Jul. 20, 2023, 9 pages.
U.S. Appl. No. 17/357,214 , "Non-Final Office Action", Oct. 6, 2022, 9 pages.
U.S. Appl. No. 17/357,214 , "Notice of Allowance", Feb. 7, 2024, 8 pages.
CN202180045343.8 , "Office Action", May 28, 2024, 26 pages.
EP15771328.0 , "Notice of Opposition", Feb. 18, 2021, 3 pages.
EP15771328.0 , "Summons to Attend Oral Proceedings", Oct. 27, 2021, 8 pages.
EP21829795.0 , "Extended European Search Report", Jun. 14, 2024, 10 pages.

(Continued)

*Primary Examiner* — Elizabeth A. Bolden
(74) *Attorney, Agent, or Firm* — Kilpatrick Townsend & Stockton, LLP

(57) ABSTRACT

Glass compositions suitable for fiber forming having rare earth oxides ($RE_2O_3$) and glass fibers having a high modulus are disclosed. The glass composition may include $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, and $B_2O_3$ less than 4.5 weight percent. The glass compositions can be used to form glass fibers and incorporated into various composites.

20 Claims, No Drawings

(56)         References Cited

OTHER PUBLICATIONS

JP2017-513108 , "Notice of Allowance", Feb. 26, 2021, 3 pages.
JP2020-186520 , "Office Action", Aug. 3, 2022, 1 page.
JP2020-186520 , "Office Action", Nov. 5, 2021, 1 pages.
Li , et al., "High-Performance Glass Fiber Development for Composite Applications", International Journal of Applied Glass Science, vol. 5, No. 1, Mar. 2014, pp. 65-81.
Loewenstein , "The Manufacturing Technology of Continuous Glass Fibers", 3rd Edition, Glass Science and Technology, 1993, 2 pages.
MX/A/2017/002820 , "Notice of Allowance", Apr. 17, 2023, 3 pages.
MX/A/2017/002820 , "Office Action", Nov. 11, 2022, 5 pages.
MX/A/2022/016079 , "Office Action", Jan. 19, 2023, 2 pages.
PCT/US2021/038888 , "International Preliminary Report on Patentability", Jan. 5, 2023, 6 pages.

PCT/US2021/038888 , "International Search Report and Written Opinion", Sep. 15, 2021, 8 pages.
Zu , et al., "Compositional Effects on Mechanical Properties, Viscosity, and Crystallization of ($Li_2O$, $B_2O_3$, MgO)—$Al_2O_3$—$SiO_2$ Glasses", Journal of Alloys and Compounds, vol. 728, Dec. 25, 2017, pp. 552-563.
Application No. BR112022025501-2 , Office Action, Mailed On May 13, 2025, 4 pages.
Application No. JP2022-579743 , Office Action, Mailed On Jun. 12, 2025, 11 pages.
Application No. TW111101161 , Office Action, Mailed On Jul. 29, 2025, 6 pages.
Application No. CN202180045343.8 , Office Action, Mailed On Feb. 19, 2025, 10 pages.
Application No. CN202180045343.8 , Office Action, Mailed On Oct. 13, 2024, 17 pages.
Application No. RU2023101365 , Office Action, Mailed On Oct. 10, 2024, 11 pages.

GLASS COMPOSITIONS, FIBERIZABLE GLASS COMPOSITIONS, AND GLASS FIBERS MADE THEREFROM

CROSS-REFERENCE TO RELATED APPLICATIONS

This application is a continuation of U.S. patent application Ser. No. 17/357,214, filed on Jun. 24, 2021, which claims the benefit of and priority to U.S. Provisional Patent Application Ser. No. 63/043,874, filed on Jun. 25, 2020, which are each hereby incorporated by reference as though fully set forth herein.

FIELD

Described herein are glass compositions, and in particular, glass compositions for forming fibers.

BACKGROUND

Glass fibers have been used to reinforce various polymeric resins for many years. Some commonly used glass compositions for use in reinforcement applications include the "E-glass", "R-glass", and "D-glass" families of compositions. "S-glass" is another commonly used family of glass compositions that includes, for example, glass fibers commercially available from AGY (Aiken, South Carolina) under the trade name "S-2 Glass."

Glass fibers fall into two categories: general purpose and special purpose. The most widely used glass fiber types are general purpose, also known as E-Glass fibers. Overall E-Glass offers good mechanical, electrical and corrosion properties.

As the possible market applications of composites continue to grow, users of glass fibers have faced challenges to meet the demands related to performance, cost, reliability, and durability, as well as the increased focus on sustainability and environmental stewardship. Included among the challenges are: the length requirements of wind blades continue to grow; power plants want maximum performance and lifetime from pipes and tanks in harsh conditions and environments; demands for fuel economy with sacrifice of performance are bringing changes to the automotive industry; energy market exploration of light-weight, large compress natural gas (CNG) tanks to lower delivery costs; and continued advancements in technology require the signal speed of circuit boards to be more robust than ever before.

Fiber glass manufacturers continue to seek glass compositions that can be used to form glass fibers having desirable mechanical properties in a commercial manufacturing environment.

SUMMARY

Various embodiments of the present invention provide glass compositions, fiberizable glass compositions, and glass fibers formed from such compositions, as well as fiber glass strands (roving or chopped), yarns, fabrics, and thermoset and thermoplastic composites comprising such glass fibers adapted for use in various applications.

In an embodiment, a glass composition suitable for fiber forming may comprise $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, less than 1 weight percent $Fe_2O_3$, less than 2 weight percent $TiO_2$, less than 3 weight percent $Na_2O$, up to 12 weight percent $Y_2O_3$, up to 6 weight percent $CeO_2$, up to 4 weight percent ZnO, less than 1 weight percent $Li_2O$, and up to 4.5 weight percent $B_2O_3$.

In some embodiments, the composition may include a ratio of CaO to MgO (CaO/MgO) of less than about 2.0, a $(SiO_2+Al_2O_3)$ content may be greater than about 70 weight percent, or a (MgO+CaO) content ranging from about 6 to about 25 weight percent. In some embodiments, the composition may be substantially free of $B_2O_3$, or the composition may be substantially free of $SO_3$. In some embodiments, the rare earth oxide, $(RE_2O_3)$, content may be up to 12 weight percent, where the total $RE_2O_3$ is primarily $Y_2O_3$ or $CeO_2$ or both $Y_2O_3$ and $CeO_2$, without excluding other members of rare earth family, e.g., $La_2O_3$, $Nd_2O_3$, $Gd_2O_3$, from impurities of $RE_2O_3$ or intentionally added, or a ratio of $RE_2O_3$ to MgO ($RE_2O_3$/MgO) up to 1.5. In some embodiments, the composition may have a ratio of $Al_2O_3$ to RO ($Al_2O_3$/RO) of less than 5, where RO is sum of MgO, CaO, and ZnO.

In any of the foregoing embodiments, additional embodiments may include a plurality of glass fibers formed from the glass composition described above. In any of the foregoing embodiments, the glass fibers have a modulus greater than 86 GPa, the glass fibers have a density less than 2.8 g/cm³, the glass fibers have a forming temperature $(T_F)$ of less than 1350° C., the glass fibers have a liquidus temperature $(T_L)$ of less than 1380° C., the glass fibers have a melting temperature $(T_M)$ of less than 1550° C., or the glass fibers have a specific modulus of greater than 3.2 Mm. In some embodiments, the plurality of glass fibers are formed into a roving, a yarn, a woven fabric, a non-woven fabric, a unidirectional fabric, or a chopped fiber glass strand.

Some embodiments of the present invention relate to fiber glass strands. A number of fiberizable glass compositions are disclosed herein as part of the present invention, and it should be understood that various embodiments of the present invention can comprise glass fibers, fiber glass strands, yarns, and other products incorporating glass fibers formed from such compositions. In one embodiment, a plurality of glass fibers formed from a glass composition may comprise $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, less than 1 weight percent $Fe_2O_3$, less than 2 weight percent $TiO_2$, less than 3 weight percent $Na_2O$, up to 12 weight percent $Y_2O_3$, less than 1 weight percent $Li_2O$, up to 4.5 weight percent $B_2O_3$, and up to 6 weight percent $CeO_2$ and have a Young's modulus of greater than 86 GPa.

Some embodiments of the present invention relate to yarns formed from at least one fiber glass strand formed from a glass composition described herein. Some embodiments of the present invention relate to fabrics incorporating at least one fiber glass strand formed from a glass composition described herein. In some embodiments, a fill yarn used in the fabric can comprise the at least one fiber glass strand. A warp yarn, in some embodiments, can comprise the at least one fiber glass strand. In some embodiments, fiber glass strands can be used in both fill yarns and warp yarns to form fabrics according to the present invention. In some embodiments, fabrics of the present invention can comprise a plain weave fabric, twill fabric, crowfoot fabric, satin weave fabric, stitch bonded fabric, or 3D woven fabric.

Some embodiments of the present invention relate to composites comprising a polymeric resin and glass fibers formed from one of the various glass compositions described herein. The glass fibers can be from a fiber glass strand according to some embodiments of the present invention. In some embodiments, the glass fibers can be incorporated into a fabric, such as a woven fabric. For example, the glass fibers can be in a fill yarn and/or a warp yarn that are woven to form a fabric. In embodiments where the composite comprises a fabric, the fabric can comprise a plain weave fabric, twill fabric, crowfoot fabric, satin weave fabric, stitch bonded fabric, or 3D woven fabric.

The glass fibers can be incorporated into the composite in other forms as well as discussed in more detail below.

Composites of the present invention may comprise one or more of a variety of polymeric materials (e.g., polymeric resins). In some embodiments, the polymeric resin may comprise at least one of polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, and thermoset polyurethane resins. The polymeric resin can comprise an epoxy resin in some embodiments.

Composites of the present invention can be in a variety of forms and can be used in a variety of applications. Some examples of potential uses of composites according to some embodiments of the present invention include, without limitation, wind energy (e.g., windmill blades), automotive applications, safety/security applications (e.g., ballistics armor), aerospace or aviation applications (e.g., interior floors of planes), high pressure vessels or tanks, missile casings, electronics, and others.

These and other embodiments of the present invention are described in greater detail in the Detailed Description that follows.

DETAILED DESCRIPTION OF THE INVENTION

Embodiments of the present invention relates generally to glass compositions. In one aspect, the present invention provides glass fibers formed from glass compositions described herein. In some cases, the glass compositions may comprise one or more rare earth oxide ($RE_2O_3$), including but not limited to $Y_2O_3$ and $CeO_2$. In some embodiments, glass fibers of the present invention can have improved mechanical properties, such as, for example, Young's modulus, as compared to conventional E-glass fibers. In some embodiments, the glass fibers may have a modulus greater than 86 GPa. In certain embodiments, the glass fibers may have a modulus greater than 88 GPa. In some embodiments, the glass fibers may have a density less than 2.8 $g/cm^3$. In certain embodiments, the glass fibers may have a forming temperature ($T_F$) of less than 1350° C. In some embodiments, the glass fibers may have a liquidus temperature ($T_L$) of less than 1380° C. In certain embodiments, the glass compositions may have a melt temperature ($T_M$) of less than 1550° C.

Definitions and Descriptions

The terms "invention," "the invention," "the present invention," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

The glass compositions are described in terms of weight percentage (wt. %) based on the total weight of the composition.

Glass Compositions and Fibers

The invention may be embodied in a variety of ways. In some embodiments, a glass composition suitable for fiber forming may comprise $SiO_2$, $Al_2O_3$, CaO, MgO, $Fe_2O_3$, $TiO_2$, and $Na_2O$. In some embodiments, the composition may further comprise at least one of $Y_2O_3$, $Li_2O$, $B_2O_3$, $CeO_2$, or ZnO. In some embodiments, the composition may be substantially free of $B_2O_3$, or $SO_3$.

In certain embodiments, the glass composition suitable for fiber forming as described herein may comprise $SiO_2$ from about 44.5 to about 64 weight percent (e.g., from about 45 wt. % to about 63 wt. %, from about 50 wt. % to about 62 wt. %, from about 50 wt. % to about 60 wt. %, from about 55 wt. % to about 64 wt. %). For example, the composition may include $SiO_2$ in an amount of about 44.5 wt. %, 45 wt. %, about 45.5 wt. %, about 46 wt. %, 46.5 wt. %, 47 wt. %, about 47.5 wt. %, about 48 wt. %, about 48.5 wt. %, about 49 wt. %, about 49.5 wt. %, about 50 wt. %, about 50.5 wt. %, about 51 wt. %, about 51.5 wt. %, about 52 wt. %, about 52.5 wt. %, about 53 wt. %, about 53.5 wt. %, about 54 wt. %, about 54.5 wt. %, about 55 wt. %, about 55.5 wt. %, about 56 wt. %, about 56.5 wt. %, about 57 wt. %, about 57.5 wt. %, about 58 wt. %, about 58.5 wt. %, about 59 wt. %, about 59.5 wt. %, about 60 wt. %, about 60.5 wt. %, about 61 wt. %, about 61.5 wt. %, about 62 wt. %, about 62.5 wt. %, about 63 wt. %, about 63.5 wt. %, 64 wt. %.

In some examples, the glass composition suitable for fiber forming as described herein may comprise $Al_2O_3$ from about 12 to about 32 weight percent (e.g., from about 12.1 wt. % to about 31.9 wt. %, from about 13 wt. % to about 30 wt. %, from about 15 wt. % to about 29 wt. %, from about 12.9 wt. % to about 31.1 wt. %, or from about 12 wt. % to about 20 wt. %). For example, the composition may include $Al_2O_3$ in an amount of about 12 wt. %, about 12.5 wt. %, about 13 wt. %, about 13.5 wt. %, about 14 wt. %, about 14.5 wt. %, about 15 wt. %, about 15.5 wt. %, about 16 wt. %, about 16.5 wt. %, about 17 wt. %, about 17.5 wt. %, about 18 wt. %, about 18.5 wt. %, about 19 wt. %, about 19.5 wt. %, about 20 wt. %, about 20.5 wt. %, about 21 wt. %, about 21.5 wt. %, about 22 wt. %, about 22.5 wt. %, about 23 wt. %, about 23.5 wt. %, about 24 wt. %, about 24.5 wt. %, about 25 wt. %, about 25.5 wt. %, about 26 wt. %, about 26.5 wt. %, about 27 wt. %, about 27.5 wt. %, about 28 wt. %, about 28.5 wt. about 29 wt. %, about 29.5 wt. %, about 30 wt. %, about 30.5 wt. %, about 31 wt. %, about 31.5 wt. %, or about 32 wt. %.

In some embodiments, the glass composition suitable for fiber forming as described herein may comprise CaO from about 0.1 to about 15.5 weight percent (e.g., from about 0.11 wt. % to about 15.45 wt. %, from about 0.2 wt. % to about 8 wt. %, from about 0.5 wt. % to about 10 wt. %). For example, the composition may include CaO in an amount of about 0.1 wt. %, about 0.2 wt. %, about 0.3 wt. %, about 0.4 wt. %, about 0.5 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt. %, or about 15.5 wt. %.

In some embodiments, the glass composition suitable for fiber forming as described herein may comprise MgO from about 5 to about 22 weight percent (e.g., from about 5.1 wt. % to about 20 wt. %, from about 5.5 wt. % to about 15 wt. %, from about 6 wt. % to about 10 wt. %, or from about 8 wt. % to about 12 wt. %). For example, the composition may include MgO in an amount of about 5 wt. %, about 5.1 wt. %, about 5.2 wt. %, about 5.3 wt. %, about 5.4 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. % about 14.5 wt. %, about 15 wt. %, about 15.5 wt. %, about 16 wt. %, about 16.5 wt. %, about 17 wt. %, about 17.5 wt. %, about 18 wt. %, about 18.5 wt. %, about 19 wt. %, about 19.5 wt. %, about 20 wt. %, about 20.5 wt. %, about 21 wt. %, about 21.5 wt. %, or about 22 wt. %.

In some embodiments, the glass composition suitable for fiber forming as described herein may comprise $Fe_2O_3$ in an amount less than 1 weight percent. For example, the composition may include $Fe_2O_3$ in an amount of about 0.2 wt. %, about 0.25 wt. %, 0.3 wt. %, 0.35 wt. %, 0.4 wt. %, 0.45 wt. %, 0.5 wt. %, 0.55 wt. %, 0.6 wt. %, 0.65 wt. %, 0.7 wt. %, 0.75 wt. %, 0.8 wt. %, 0.85 wt. %, 0.9 wt. %, 0.95 wt. %, up to 1.0 wt. %.

In some embodiments, the glass composition suitable for fiber forming as described herein may comprise $TiO_2$ in an amount less than 2 weight percent. For example, the composition may include $TiO_2$ in an amount of about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or up to 2 wt. %.

In some embodiments, the glass composition suitable for fiber forming as described herein may comprise ZnO in an amount up to 4 weight percent. For example, the composition may include ZnO in an amount of about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 1.1 wt. %, about 1.25 wt. %, about 1.5 wt. %, about 1.75 wt. %, about 2 wt. % about 2.5 wt. %, about 3 wt. %, about 3.5 wt. %, or about 4 wt. %.

Optionally, some embodiments of the glass composition suitable for fiber forming as described herein may comprise $Li_2O$ in an amount less than 1 weight percent. For example, the composition may include $Li_2O$ in an amount of about 0.1 wt. %, about 0.15 wt. %, about 0.2 wt. %, about 0.25 wt. %, about 0.3 wt. %, about 0.35 wt. %, about 0.4 wt. %, about 0.45 wt. %, about 0.5 wt. %, about 0.55 wt. %, about 0.6 wt. %, about 0.65 wt. %, about 0.7 wt. %, about 0.75 wt. %, about 0.8 wt. %, about 0.85 wt. %, about 0.9 wt. %, about 0.95 wt. %, or about 1 wt. %. In some cases, $Li_2O$ may be present in an amount greater than 0 weight percent and less than 1 weight percent. In some cases, the composition may be substantially free of $Li_2O$.

Optionally, some embodiments of the glass composition suitable for fiber forming as described herein may comprise rare earth oxides ("$RE_2O_3$") in an amount up to 12 weight percent (e.g., up to about 11.9 wt. %, up to about 11.5 wt. %, up to 11 wt. %, up to about 10 wt. %, up to about 7.5 wt. %, or up to about 6 wt. %). For example, the composition may include $RE_2O_3$ in an amount of up to about 0.1 wt. %, about 0.15 wt. %, about 0.2 wt. %, about 0.25 wt. %, about 0.3 wt. %, about 0.35 wt. %, about 0.4 wt. %, about 0.45 wt. %, about 0.5 wt. %, about 0.55 wt. %, about 0.6 wt. %, about 0.65 wt. %, about 0.7 wt. %, about 0.75 wt. %, about 0.8 wt. %, about 0.85 wt. %, about 0.9 wt. %, about 0.95 wt. %, about 1 wt. %, about 1.25 wt. %, about 1.5 wt. %, about 1.75 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, or about 12 wt. %. As used herein, the term "rare earth oxides" as understood to those of skill in the art, refers to oxides incorporating a rare earth metal and includes oxides of scandium ($Sc_2O_3$), yttrium ($Y_2O_3$), and the lanthanide elements (lanthanum ($La_2O_3$), cerium ($Ce_2O_3$ and $CeO_2$), praseodymium ($Pr_2O_3$), neodymium ($Nd_2O_3$), promethium ($Pm_2O_3$), samarium ($Sm_2O_3$), europium ($Eu_2O_3$ and $EuO$), gadolinium ($Gd_2O_3$), terbium ($Tb_2O_3$), dysprosium ($Dy_2O_3$), holmium ($Ho_2O_3$), erbium ($Er_2O_3$), thulium ($Tm_2O_3$), ytterbium ($Yb_2O_3$), and lutetium ($Lu_2O_3$). The rare earth oxides may be included in the glass compositions of the present invention in amounts that exceed those wherein the rare earth oxide is present only as a tramp material or impurity in a batch material included with a glass batch to provide another component. The glass compositions, in some embodiments, can comprise a combination of rare earth oxides (e.g., one or more of various rare earth oxides). In some embodiments, $RE_2O_3$ may comprise at least one of $La_2O_3$, $Y_2O_3$, $Sc_2O_3$, and $Nd_2O_3$. In some embodiments, $RE_2O_3$ may be $Y_2O_3$ and $CeO_2$. In some cases, $RE_2O_3$ may be present in an amount greater than 0 weight percent and less than 1 weight percent. In some cases, the composition may be substantially free of $RE_2O_3$.

Not intending to be bound by theory, the inclusion of $RE_2O_3$ in glass compositions may have a desirable impact on glass softening temperature and glass transition temperature as well as on modulus, tensile strength, elongation, coefficient of thermal expansion, and other properties of glass fibers formed from the compositions.

In some embodiments, the rare earth oxide used in glass compositions can comprise $Y_2O_3$ in an amount between about 0.5 and about 12 weight percent. In some embodiments, the glass compositions can comprise up to about 12 weight percent $Y_2O_3$ (e.g., up to about 11.9 wt. %, up to about 8 wt. %, up to 5 wt. %, or up to about 2 wt. %). For example, the composition may include $Y_2O_3$ in an amount of up to about 0.5 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, or about 12 wt. %. As set forth above and in the Examples below, other amounts of $Y_2O_3$ can also be included in glass compositions according to some embodiments.

In some embodiments, the rare earth oxide used in glass compositions can comprise $CeO_2$ in an amount between about 0.15 and about 6 weight percent. In some embodiments, the glass compositions can comprise up to about 6 weight percent $CeO_2$ (e.g., up to about 5 wt. %, up to about 3.3 wt. %, up to 2 wt. %, or up to about 1.7 wt. %). For example, the composition may include $CeO_2$ in an amount of up to about 0.25 wt. %, about 0.5 wt. %, about 0.75 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, or about 6 wt. %. As set forth above and in the Examples below, other amounts of $CeO_2$ can also be included in glass compositions according to some embodiments. For example, in some embodiments, $CeO_2$ can be present in an amount between 0 and about 4 weight percent. Although cerium oxide can be introduced in the stable form of $CeO_2$, a majority of cerium in the glass, when melted at high temperature, reduces from $Ce^{4+}$ (in $CeO_2$) to $Ce^{3+}$ (becoming $Ce_2O_3$). In this regard, the inclusion of cerium oxide is believed to improve not only the sonic modulus (or Young's modulus), strength, and resistance to radiation of glass fibers formed from the compositions, but also to increase glass quality through better fining of the glass during melting during which cerium oxide releases oxygen bubbles as $Ce^{4+}$ ions in the melt reduce to $Ce^{3+}$ ions.

Various combinations of rare earth oxides can be also used to achieve desirable properties (e.g., tensile strength, modulus, specific strength, specific modulus, etc.). For example, the selection of a particular rare earth oxide and its relative amount can impact the fiber density which can in turn impact specific strength (tensile strength divided by density) and specific modulus (modulus divided by density). Likewise, the selection of a particular rare earth oxide and its relative amount can impact melt properties of the glass compositions. For example, as noted above, the presence of $Y_2O_3$ in certain amounts can increase the liquidus temperature of a glass composition. Similarly, cerium oxide ($Ce_2O_3$ and $CeO_2$) can act as an oxidizing and fining agent, such that in some embodiments, the amount of cerium oxide can be no more than 4 weight percent. The selection of a particular rare earth oxide and its relative amount can impact density of the glass fibers. Finally, the selection of a particular rare earth oxide and its relative amount can impact the cost of making the glass fibers due to its impact on melt properties and due its cost as a raw material as the cost of rare earth oxides varies substantially. In general, for the same amount of rare earth oxide in a glass composition, the melt and mechanical properties of the glass can be controlled by selecting a combination of rare earth oxides with different field strengths as defined by $z/r^2$ where z is the charge and r is the radius of the rare earth cation.

Some embodiments can be characterized by the amount of $Na_2O$ present in the glass compositions. In some embodiments, the glass composition may comprise less than 3 weight percent $Na_2O$ (e.g., less than 2.9 wt. %, less than 1 wt. %, less than 0.5 wt. %, or less than 0.25 wt. %). In some cases, the composition may be substantially free of $Na_2O$. $Na_2O$ can be present, in some embodiments, in an amount between about 0 and about 1.5 weight percent. $Na_2O$ can be present, in some embodiments, in an amount up to about 1.0 weight percent. In some embodiments, $Na_2O$ can be present in an amount up to about 0.5 weight percent. In some embodiments, glass compositions can comprise less than about 0.1 weight percent $Na_2O$.

Some embodiments can be characterized by the amount of $B_2O_3$ present in the glass compositions. $B_2O_3$ can be present in an amount between about 0 and about 4.5 weight percent in some embodiments. In some embodiments, $B_2O_3$ can be present in an amount between about 0 and about 3 weight percent. $B_2O_3$ can be present, in some embodiments, in an amount between about 0 and about 1 weight percent. In some embodiments, glass compositions can be substantially free of $B_2O_3$, meaning that any $B_2O_3$ present in the glass composition would result from $B_2O_3$ being present as a trace impurity in a batch material.

Sulfate (expressed as $SO_3$) may also be present as a refining agent. Small amounts of impurities may also be present from raw materials or from contamination during the melting processes, such as SrO, BaO, $Cl_2$, $P_2O_5$, $Cr_2O_3$, or NiO (not limited to these particular chemical forms). Other refining agents and/or processing aids may also be present such as $As_2O_3$, MnO, $MnO_2$, or $Sb_2O_3$ (not limited to these particular chemical forms). These impurities and refining agents, when present, are each typically present in amounts less than 0.1% by weight of the total glass composition. In some embodiments, glass compositions can be substantially free of $SO_3$, In some embodiments, the glass composition suitable for fiber forming as described herein may comprise a ratio of CaO to MgO ("CaO/MgO") up to about 2.0 (e.g., up to about 1.9, up to about 1.5, up to about 1.2, up to about 0.8, or up to about 0.4). For example, the composition may include CaO/MgO in an amount of about 0.01, about 0.02, about 0.03, about 0.04, about 0.05, about 0.06, about 0.07, about 0.08, about 0.09, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, about 1, about 1.05, about 1.1, about 1.15, about 1.2, about 1.25, about 1.3, about 1.35 about 1.4, about 1.45, about 1.5, about 1.55, about 1.6, about 1.65, about 1.7, about 1.75, about 1.8, about 1.85, about 1.9 about 1.95, or about 2.

In some embodiments, the glass composition suitable for fiber forming as described herein may comprise a combined content of $SiO_2$ and $Al_2O_3$ ("$SiO_2+Al_2O_3$") of greater than about 70 wt. % (e.g., greater than about 71 wt. %, greater than about 74 wt. %, greater than about 78 wt. %, greater than about 85 wt. %, or greater than about 70.05 wt. %). For example, the composition may include ($SiO_2+Al_2O_3$) in an amount of greater than about 70 wt. %, about 70.5 wt. %, about 71 wt. %, about 71.5 wt. %, about 72 wt. %, about 72.5 wt. %, about 73 wt. %, about 73.5 wt. %, about 74 wt. %, about 74.5 wt. %, about 75 wt. %, about 75.5 wt. %, about 76 wt. %, about 76.5 wt. %, about 77 wt. %, about 77.5 wt. %, about 78 wt. %, about 78.5 wt. %, about 79 wt. %, about 79.5 wt. %, about 80 wt. %, about 80.5 wt. %, about 81 wt. %, about 81.5 wt. %, about 82 wt. %, about 82.5 wt. %, about 83 wt. %, about 83.5 wt. %, about 84 wt. %, about 84.5 wt. %, about 85 wt. %, about 85.5 wt. %, about 86 wt. %, about 86.5 wt. %, about 87 wt. %, about 87.5 wt. about 88 wt. %, about 88.5 wt. %, about 89 wt. %, about 89.5 wt. %, about 90 wt. %, about 90.5 wt. %, about 91 wt. %, about 91.5 wt. %, or greater than about 92 wt. %.

In some embodiments, the glass composition suitable for fiber forming as described herein may comprise In some embodiments, the composition may have a ratio of $Al_2O_3$ to RO ($Al_2O_3$/RO) of less than 5, where RO is sum of MgO, CaO, and ZnO (e.g., less than about 4, less than about 2, or less than about 1). For example, the composition may include $Al_2O_3$/RO in an amount of about 0.02, about 0.05, about 0.07, about 0.1, about 0.15, about 0.2, about 0.25, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9, about 3, about 3.1, about 3.2 about 3.3, about 3.4, about 3.5, about 3.6, about 3.7, about 3.8, about 3.9, about 4, about 4.1, about 4.2 about 4.3, about 4.4, about 4.5, about 4.6, about 4.7, about 4.8, about 4.9, or about less than 5.

In some embodiments, the glass composition suitable for fiber forming as described herein may comprise a combined content of MgO and CaO ("MgO+CaO") of from about 6 wt. % to about 25 wt. % (e.g. from about 6.5 wt. % to about 22 wt. %, from about 8 wt. % to about 15 wt. %, or from about 12 wt. % to about 24 wt. %). For example, the composition may include (MgO+CaO) in an amount of about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt. %, about 15.5 wt. %, about 16 wt. %, about 16.5 wt. %, about 17 wt. %, about 17.5 wt. %, about 18 wt. %, about 18.5 wt. %, about 19 wt. %, about 19.5 wt. %, about 20 wt. %, about 20.5 wt. %, about 21 wt. %, about 21.5 wt. %, about 22 wt. %, about 22.5 wt. %, about 23 wt. %, about 23.5 wt. %, about 24 wt. %, about 24.5 wt. %, or about 25 wt. %.

In some embodiments, the glass composition suitable for fiber forming as described herein may comprise In some embodiments, the composition may have a ratio of $RE_2O_3$ to MgO ($RE_2O_3$/MgO) of up to 1.5 (e.g., up to about 1.2, up to about 1, or up to about 0.5). For example, the composition may include $RE_2O_3$/MgO in an amount of about 0, 0.02, about 0.05, about 0.07, about 0.1, about 0.15, about 0.2, about 0.25, about 0.3, about 0.4, about 0.5, about 0.6, about 0.7, about 0.8, about 0.9, about 1, about 1.1, about 1.2, about 1.3, about 1.4, or about 1.5.

In some embodiments, the glass composition suitable for fiber forming may comprise: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, less than 1 weight percent $Fe_2O_3$, less than 2 weight percent $TiO_2$, up to 4 weight percent ZnO, and less than 3 weight percent $Na_2O$. In some embodiments, the composition may further comprise up to 12 weight percent $RE_2O_3$. In some embodiments, the composition may further comprise less than 1 weight percent $Li_2O$ and less than 4.5 weight percent $B_2O_3$.

In some cases, the glass composition suitable for fiber forming may comprise: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, less than 1 weight percent $Fe_2O_3$, less than 2 weight percent $TiO_2$, up to 4 weight percent ZnO, less than 3 weight percent $Na_2O$, and up to 12 weight percent $Y_2O_3$, In some embodiments, the composition may further comprise less than 1 weight percent $Li_2O$.

In some cases, the glass composition suitable for fiber forming may comprise: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, less than 1 weight percent $Fe_2O_3$, less than 2 weight percent $TiO_2$, less than 3 weight percent $Na_2O$, up to 12 weight percent $Y_2O_3$, up to 6 weight percent $CeO_2$, up to 4 weight percent ZnO, less than 1 weight percent $Li_2O$, up to 4.5 weight percent $B_2O_3$.

It should be understood that any component of a glass composition described as being present in amount from about 0 weight percent to another weight percent is not necessarily required in all embodiments. Such components may be optional in some embodiments. Likewise, in some embodiments, glass compositions can be substantially free of some components; any amount of the component present in the glass composition would result from the component being present as a trace impurity in a batch material. A component present as a trace impurity is not intentionally added to the glass composition, but rather, it may be present in a herein described glass composition by virtue of its presence as an impurity in a starting material added to the glass composition. Generally, a trace impurity is present in the glass composition in an amount no greater than about 0.1 weight percent, although some trace impurities may be present in the glass composition in an amount up to about 0.5 weight percent.

In some embodiments, the glass compositions of the present invention may be fiberizable. In some embodiments, glass compositions may have forming temperatures ($T_F$) desirable for use in commercial fiber glass manufacturing operations. As used herein, the term "forming temperature" or $T_F$, means the temperature at which the glass composition has a viscosity of 1000 poise (or "log 3 temperature").

Glass compositions, in some embodiments, have a forming temperature ($T_F$) ranging from about 1250° C. to about 1350° C. In another embodiment, glass compositions have a forming temperature ranging from about 1275° C. to about 1330° C. In some embodiments, the glass compositions may have a forming temperature ($T_F$) less than 1350° C. (e.g., less than 1320° C., less than 1300° C.). By way of example, rounded to the nearest 5° C., the $T_F$ may be about 1250° C., about 1255° C., about 1260° C., about 1265° C., about 1270° C., about 1275° C., about 1280° C., about 1285° C., about 1290° C., about 1295° C., about 1300° C., about 1305° C., about 1310° C., about 1315° C., about 1320° C., about 1325° C., about 1330° C., about 1335° C., about 1340° C., about 1345° C., or about 1350° C.

Glass compositions, in some embodiments, have a liquidus temperature ranging from about 1175° C. to about 1380° C. In some embodiments, glass compositions have a liquidus temperature ranging from about 1200° C. to about 1350° C. In some embodiments, the glass compositions may have a liquidus temperature ($T_L$) of less than 1380° C. (e.g., less than 1350° C., less than 1300). For example, the TI, may be about 1175° C., about 1180° C., about 1185° C., about 1190° C., about 1195° C., about 1200° C., about 1205° C., about 1210° C., about 1215° C., about 1220° C., about 1225° C., about 1230° C., about 1235° C., about 1240° C., about 1245° C., about 1250° C., about 1255° C., about 1260° C., about 1265° C., about 1270° C., about 1275° C., about 1280° C., about 1285° C., about 1290° C., about 1295° C., about 1300° C., about 1305° C., about 1310° C., about 1315° C., about 1320° C., about 1325° C., about 1330° C., about 1335° C., about 1340° C., about 1345° C., about 1350° C., about 1355° C., about 1360° C., about 1365° C., about 1370° C., about 1375° C., or about 1380° C.

In some embodiments, the difference between the forming temperature ($T_F$) and the liquidus temperature ($T_L$) of a glass composition may be desirable for commercial fiber glass manufacturing operations. For example, in some embodiments of glass compositions, the difference between the $T_F$ and the $T_L$ ("delta T" or "$\Delta T$") may be less than about 95° C. (e.g., less than 70° C., less than 50° C.). For example, the delta T may be less than about 0° C., about 5° C., about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C. In some embodiments, the glass compositions may have a delta T less than 60° C.

In some embodiments, the glass compositions may have a delta T value that is less than 50° C. or even negative, i.e., less than 0° C., as determined using $T_F$ on a log 3 temperature basis. For these cases, the actual glass fiber forming process can setup an actual fiber drawing temperature ($T_F^{ac\text{-}tual}$) greater than the liquidus temperature by at least 60° C., i.e., $T_F^{actual} = T_L + 60°$ C., independent of the calculated difference between the log 3 based $T_F$ and $T_L$.

In some embodiments, the glass compositions may have a melting temperature ($T_M$) of less than 1550° C. (e.g., less than 1510° C., less than 1480° C.). For example, the $T_M$ may be about 1450° C., about 1452° C., about 1454° C., about 1456° C., about 1458° C., about 1460° C., about 1462° C., about 1464° C., about 1466° C., about 1468° C., about 1470° C., about 1472° C., about 1474° C., about 1476° C., about 1478° C., about 1480° C., about 1482° C., about 1484° C., about 1486° C., about 1488° C., about 1490° C., about 1492° C., about 1494° C., about 1496° C., about 1498° C., about 1500° C., about 1502° C., about 1504° C., about 1506° C., about 1508° C., about 1510° C., about 1512° C., about 1514° C., about 1516° C., about 1518° C., about 1520° C., about 1522° C., about 1524° C., about 1526° C., about 1528° C., about 1530° C., about 1532° C., about 1534° C., about 1536° C., about 1538° C., about 1540° C., about 1542° C., about 1544° C., about 1546° C., about 1548° C., or about 1550° C.

In some embodiments, glass fibers may be formed from the glass compositions described herein. Optionally, the glass fibers may be arranged into a fabric. In some embodiments, glass fibers may be provided in other forms including, for example and without limitation, as continuous strands, chopped strands (dry or wet), yarns, rovings, prepregs, etc. Various embodiments of the glass compositions (and any fibers formed therefrom) may be used in a variety of applications. In some embodiments, the fibers may be fiber glass strands, while other embodiments may be yarns comprising fiber glass strands. Some embodiments of yarns may be particularly suitable for weaving applications. In some embodiments, the fibers may be glass fiber fabrics. Some embodiments of fiber glass fabrics of the present invention are particularly suitable for use in reinforcement applications, especially reinforcement applications in which high modulus, high strength, and/or high elongation are important.

Some embodiments of the present invention may relate to composites that incorporate fiber glass strands, fiber glass yarns, and fiber glass fabrics, such as fiber reinforced polymer composites. Some composites may be particularly suitable for use in reinforcement applications, especially reinforcement applications in which high modulus, high strength, and/or high elongation are important, such as wind energy (e.g., windmill blades), automotive applications, safety/security applications (e.g., ballistics armor or armor panels), aerospace or aviation applications (e.g., interior floors of planes), high pressure vessels or tanks, missile casings, and others.

Some embodiments of the present invention relate to composites suitable for use in wind energy applications. Composites of the present invention can be suitable for use in wind turbine blades, particularly long wind turbine blades that are lighter weight but still strong compared to other long wind turbine blades. Lower weight and increased stability in wind energy blades are key considerations for selection of composite materials. The design of wind energy blades has changed over time to pursue longer blades to harvest more energy. Some blades may be 82 meters in length and benefit from improved fiber composites. A stronger glass fiber composite such as those disclosed herein may be useful to achieve a larger wind blade size while providing the strength and weight needed to stay within the load design of windmill. Lighter and stronger materials like the present invention may provide an increase in energy yield and result in improved operating costs, reduced installation costs, ease of transportation, and improved safety.

Still other embodiments of the present invention may relate to automotive composites. Some embodiments of the present invention may relate to aerospace composites. Other embodiments of the present application may relate to aviation composites. Some embodiments of the present invention relate to composites for safety/security applications such as armor panels. Other embodiments of the present invention may relate to composites for high pressure vessels or storage tanks. Some embodiments of the present invention may relate to composites for missile casings. Other embodiments of the present invention may relate to composites for use in high temperature thermal insulation applications. Some embodiments of the present invention may relate to printed circuit boards where lower coefficients of thermal expansion are particularly desirable such as substrates for chip packaging. Some embodiments of the present invention may relate to prepreg. Some embodiments of the present invention may relate to long fiber reinforced thermoplastics (LFT) for various automobile parts. Some embodiments of the present invention may relate to pipes or tanks for chemical transportation and chemical storage. Some embodiments of the present invention may relate to nonwoven, texturized fibers for thermal and sonic management applications, such as muffler for motorbikes, vehicles, and trucks. Some embodiments of the present invention may relate to electrical insulating rods or cables. Some embodiments of the present invention may relate to composite rebar to replace steel rebar for road infrastructures, bridges, and buildings.

Some embodiments of the present invention relate to fiber glass strands. In some embodiments, a fiber glass strand of the present invention comprises a plurality of glass fibers. In some embodiments, a plurality of glass fibers may be formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $Li_2O$ less than 1 weight percent, $B_2O_3$ less than 4.5 weight percent, $CeO_2$ up to 6 weight percent, and ZnO up to 4 weight percent. In some embodiments, the ratio of CaO to MgO (CaO/MgO) of the composition can be less than about 2.0. In some cases, the composition may be substantially free of $SO_3$. In some cases, the composition may further comprise less than 3 weight percent $Na_2O$.

In some embodiments, a plurality of glass fibers may be formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the ratio of CaO to MgO (Ca/MgO) of the composition can be less than about 2.0. In some cases, the composition may be substantially free of $SO_3$. In some cases, the composition may further comprise less than 3 weight percent $Na_2O$.

In some embodiments, a glass fiber or a plurality of glass fibers may be formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the ratio of CaO to MgO (CaO/MgO) of the composition can be less than about 2.0. In some cases, the composition may be substantially free of $SO_3$. In some cases, the composition may further comprise less than 3 weight percent $Na_2O$.

In some embodiments, a glass fiber or a plurality of glass fibers may be formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the ratio of CaO to MgO (CaO/MgO) of the composition can be less than about 2.0. In some cases, the composition may be substantially free of $SO_3$. In some cases, the composition may further comprise less than 3 weight percent $Na_2O$.

In some embodiments, a glass fiber or a plurality of glass fibers may be formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the Young's modulus may be greater than 86 GPa. In some embodiments, the Young's modulus may be greater than 88 GPa. In some embodiments, the ratio of CaO to MgO (CaO/MgO) of the composition can be less than about 2.0. In some cases, the composition may be substantially free of $SO_3$.

In some embodiments, a glass fiber or a plurality of glass fibers of the present invention may exhibit desirable mechanical and other properties. Glass fibers of the present invention, in some embodiments, can exhibit one or more improved mechanical properties relative to glass fibers formed from E-glass. In some embodiments, glass fibers of the present invention can provide one or more improved properties relative to glass fibers formed from R-glass and/or S-glass. Examples of desirable properties exhibited by some embodiments of glass fibers of the present invention include, without limitation, tensile strength, Young's modulus, coefficient of thermal expansion, softening point, elongation, and dielectric constant.

In some embodiments, a glass fiber or a plurality of glass fibers may be formed from the glass composition described herein. In certain embodiments, the plurality of glass fibers may have desirable Young's modulus (E) values. In some cases, the plurality of glass fibers may have a Young's modulus greater than about 86 GPa (e.g., greater than 87 GPa, greater than 88 GPa). For example, the Young's modulus may be about 86 GPa, 86.5 GPa, 87 GPa, 87.5 GPa, 88 GPa, 88.5 GPa, 89 GPa, 89.5 GPa, 90 GPa, 90.5 GPa, 91 GPa, 91.5 GPa, 92 GPa, 92.5 GPa, 93 GPa, 93.5 GPa, 94 GPa, 94.5 GPa, 95 GPa, 95.5 GPa, 96 GPa, 96.5 GPa, 97 GPa, 97.5 GPa, 98 GPa, 98.5 GPa, 99 GPa, 99.5 GPa, 100 GPa, 100.5 GPa, 101 GPa, 101.5 GPa, 102 GPa, 102.5 GPa, 103 GPa, 103.5 GPa, 104 GPa, 104.5 GPa, 105 GPa, 105.5 GPa, 106 GPa, 106.5 GPa, 107 GPa, 107.5 GPa, 108 GPa, 108.5 GPa, 109 GPa, 109.5 GPa, or 110 GPa. In some embodiments, the plurality of glass fibers may have a Young's modulus greater than about 100 GPa. In certain embodiments, the plurality of glass fibers may have a Young's modulus of up to 110 GPa.

In certain embodiments, the plurality of glass fibers may have desirable Specific modulus (Sp) values. In some cases, the plurality of glass fibers may have a Specific modulus greater than about $3.2 \times 10^6$ m (e.g., greater than $3.4 \times 10^6$ m, greater than $3.7 \times 10^6$ m). For example, the Specific modulus may be about $3.2 \times 10^6$ m, $3.25 \times 10^6$ m, $3.3 \times 10^6$ m, $3.35 \times 10^6$ m, $3.4 \times 10^6$ m, $3.45 \times 10^6$ m, $3.5 \times 10^6$ m, $3.55 \times 10^6$ m, $3.6 \times 10^6$ m, $3.65 \times 10^6$ m, $3.7 \times 10^6$ m, $3.75 \times 10^6$ m, $3.8 \times 10^6$ m, $3.85 \times 10^6$ m, $3.9 \times 10^6$ m, $3.95 \times 10^6$ m, or $4.0 \times 10^6$ m. In some embodiments, the plurality of glass fibers may have a Specific modulus greater than about $3.5 \times 10^6$ m. In certain embodiments, the plurality of glass fibers may have a Specific modulus of up to $4.0 \times 10^6$ m.

In certain embodiments, the glass fiber or plurality of glass fibers may have desirable density values. In some cases, the plurality of glass fibers may have a density less than about 2.8 $g/cm^3$ (e.g., less than 2.6 $g/cm^3$, greater than 2.55 $g/cm^3$). For example, the density may be about 2.55 $g/cm^3$, 2.56 $g/cm^3$, 2.57 $g/cm^3$, 2.58 $g/cm^3$, 2.59 $g/cm^3$, 2.6 $g/cm^3$, 2.61 $g/cm^3$, 2.62 $g/cm^3$, 2.63 $g/cm^3$, 2.64 $g/cm^3$, 2.65 $g/cm^3$, 2.66 $g/cm^3$, 2.67 $g/cm^3$, 2.68 $g/cm^3$, 2.69 $g/cm^3$, 2.7 $g/cm^3$, 2.71 $g/cm^3$, 2.72 $g/cm^3$, 2.73 $g/cm^3$, 2.74 $g/cm^3$, 2.75 $g/cm^3$, 2.76 $g/cm^3$, 2.77 $g/cm^3$, 2.78 $g/cm^3$, 2.79 $g/cm^3$, or 2.8 $g/cm^3$.

Fiber glass strands can comprise glass fibers of various diameters, depending on the desired application. In some embodiments, a fiber glass strand of the present invention may comprise at least one glass fiber having a diameter between about 5 and about 18 μm. In other embodiments, the at least one glass fiber has a diameter between about 5 and about 10 μm. In some embodiments, fiber glass strands of the present invention can be formed into rovings. Rovings may comprise assembled, multi-end, or single-end direct draw rovings. Rovings comprising fiber glass strands of the present invention can comprise direct draw single-end rovings having various diameters and densities, depending on the desired application. In some embodiments, a roving comprising fiber glass strands of the present invention exhibits a density up to about 112 yards/pound. Some embodiments of the present invention relate to yarns comprising at least one fiber glass strand as disclosed herein.

In some embodiments, a fiber glass strand may comprise the plurality of glass fibers of any one of the glass compositions described herein. For example, in some embodiments, a fiber glass strand may comprise a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, $Li_2O$ less than 1 weight percent, ZnO up to 4 weight percent, and $B_2O_3$ less than 4.5 weight percent. In some embodiments, the a ratio of CaO to MgO (CaO/MgO) of the composition may be less than about 2.0. In some cases, or the composition may be substantially free of $SO_3$.

In other embodiments, a yarn of the present invention can comprise at least one fiber glass strand comprising one of the other glass compositions disclosed herein as part of the present invention.

In some embodiments, a yarn of the present invention may comprise at least one fiber glass strand as disclosed herein, wherein the at least one fiber glass strand is at least partially coated with a sizing composition. In some embodiments, the sizing composition may be compatible with a thermosetting polymeric resin. In other embodiments, the sizing composition can comprise a starch-oil sizing composition.

Yarns can have various linear mass densities, depending on the desired application. In some embodiments, a yarn of the present invention may have a linear mass density from about 5,000 yards/pound to about 10,000 yards/pound.

Yarns can have various twist levels and directions, depending on the desired application. In some embodiments, a yarn of the present invention may have a twist in the z direction of about 0.5 to about 2 turns per inch. In other embodiments, a yarn of the present invention may have a twist in the z direction of about 0.7 turns per inch.

Yarns can be made from one or more strands that are twisted together and/or plied, depending on the desired application. Yarns can be made from one or more strands that are twisted together but not plied; such yarns are known as "singles." Yarns of the present invention can be made from one or more strands that are twisted together but not plied. In some embodiments, yarns of the present invention may comprise 1-4 strands twisted together. In other embodiments, yarns of the present invention may comprise 1 twisted strand.

In some embodiments, a fiber glass strand may comprise the plurality of glass fibers of any one of the glass compositions described herein. For example, in some embodiments, a fiber glass strand may comprise a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, $Li_2O$ less than 1 weight percent, ZnO up to 4 weight percent, and $B_2O_3$ less than 4.5 weight percent. In some embodiments, the a ratio of CaO to MgO (CaO/MgO) of the composition may be less than about 2.0. In some cases, or the composition may be substantially free of $SO_3$.

In some embodiments, a roving may comprise the plurality of glass fibers of any one of the glass compositions described herein. For example, in some embodiments, a roving may comprise a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent. In some embodiments, the composition of the fibers may further comprise $TiO_2$ less than 2 weight percent, $Na_2O$ less than 3 weight percent, $RE_2O_3$ up to 12 weight percent, $Li_2O$ less than 1 weight percent, ZnO up to 4 weight percent, or $B_2O_3$ less than 4.5 weight percent. In certain embodiments, the composition of the fibers may comprise up to 12 weight percent $Y_2O_3$, and up to 6 weight percent $CeO_2$. In some embodiments, the a ratio of CaO to MgO (CaO/MgO) of the composition may be less than about 2.0. In some cases, the composition may be substantially free of $SO_3$.

In some embodiments, a yarn may comprise the plurality of glass fibers of any one of the glass compositions described herein. For example, in some embodiments, a yarn may comprise a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, $Li_2O$ less than 1 weight percent, ZnO up to 4 weight percent, and $B_2O_3$ less than 4.5 weight percent. In some embodiments, the a ratio of CaO to MgO (CaO/MgO) of the composition may be less than about 2.0. In some cases, the composition may be substantially free of $SO_3$.

Some embodiments of the present invention relate to fabrics comprising at least one fiber glass strand as disclosed herein. In some embodiments, the fabric may be woven. In other embodiments, the fabric may be non-woven fabric or a unidirectional fabric. In some embodiments, a fabric may comprise the plurality of glass fibers of any one of the glass compositions described herein. For example, in some embodiments, a fabric may comprise a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the a ratio of CaO to MgO (CaO/MgO) of the composition may be less than about 2.0. In some cases, the composition may be substantially free of $SO_3$.

In some embodiments of the present invention comprising a fabric, the glass fiber fabric may be a fabric woven in accordance with industrial fabric style no. 7781. In other embodiments, the fabric comprises a plain weave fabric, a twill fabric, a crowfoot fabric, a satin weave fabric, a stitch bonded fabric (also known as a non-crimp fabric), or a "three-dimensional" woven fabric.

Some embodiments of the present invention relate to composites. In some embodiments, a polymeric composite may comprise a polymeric material and a plurality of glass fibers formed from a glass composition described herein. For example, in some embodiments, a polymeric composite may comprise a polymeric material and a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, $Li_2O$ less than 1 weight percent, ZnO up to 4 weight percent, and $B_2O_3$ less than 4.5 weight percent. In some embodiments, the a ratio of CaO to MgO (CaO/MgO) of the composition may be less than about 2.0. In some cases, the composition may be substantially free of $SO_3$. In some embodiments, the plurality of glass fibers may be in the form of a non-woven fabric or a unidirectional fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

In other embodiments, a composite of the present invention may comprise a polymeric resin and a plurality of glass fibers disposed in the polymeric resin, wherein at least one of the plurality of glass fibers was formed from one of the other glass compositions disclosed herein as part of the present invention. In some embodiments, a composite may comprise a polymeric resin and at least one fiber glass strand as disclosed herein disposed in the polymeric resin. In some embodiments, a composite may comprise a polymeric resin and at least a portion of a roving comprising at least one fiber glass strand as disclosed herein disposed in the polymeric resin. In other embodiments, a composite may comprise a polymeric resin and at least one yarn as disclosed herein disposed in the polymeric resin. In still other embodiments, a composite may comprise a polymeric resin and at least one fabric as disclosed herein disposed in the polymeric resin. In some embodiments, a composite may comprise at least one fill yarn comprising at least one fiber glass strand as disclosed herein and at least one warp yarn comprising at least one fiber glass strand as disclosed herein.

Composites of the present invention can comprise various polymeric resins, depending on the desired properties and applications. In some embodiments, the polymeric resin may comprise an epoxy resin. In other embodiments, the polymeric resin may comprise polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, or thermoset polyurethane resins.

In certain embodiments, an article of manufacture may comprise a plurality of glass fibers formed from the glass composition of any one of the compositions described herein. For example, in some embodiments, an article of manufacture may comprise a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the a ratio of CaO to MgO (CaO/MgO) of the composition may be less than about 2.0. In some cases, the composition may be substantially free of $SO_3$. In some embodiments, the plurality of glass fibers may be in the form of a non-woven fabric or a unidirectional fabric. In some embodiments, the plurality of glass fibers may be in the form of a woven fabric.

In other embodiments, an article of manufacture may comprise a polymeric material and a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the ratio of CaO to MgO (CaO/MgO) of the composition may be less than about 2.0. In some cases, the composition may be substantially free of $SO_3$. In some embodiments, the plurality of glass fibers may be in the form of a non-woven fabric or a unidirectional fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

Some embodiments of the present invention relate to aerospace composites. In some embodiments, an aerospace composite may exhibit properties desirable for use in aerospace applications, such as high strength, high elongation, high modulus, and/or low density. In some embodiments, an aerospace composite may comprise a plurality of glass fibers from a glass composition described herein. For example, in some embodiments, an aerospace composite may comprise a polymeric material and a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the a ratio of CaO to MgO (CaO/MgO) of the composition may be less than about 2.0. In some cases, the composition may be substantially free of $SO_3$. In some embodiments, the plurality of glass fibers may be in the form of a non-woven fabric or a unidirectional fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

Examples of components in which composites of the present invention might be used may include, but are not limited to, aerospace parts such as floor panels, overhead bins, galleys, seat backs, and other internal compartments that are potentially prone to impact, as well as external components such as helicopter rotor blades; automotive parts such as structural components, bodies, and bumpers; wind energy components such as wind turbine blades; high pressure vessels and/or tanks; safety and/or security applications; high mechanical stress applications; high energy impact applications such as ballistic or blast resistance applications; armor applications production of armor panels; casings for missiles and other explosive delivery devices; applications in the oil and gas industry, other applications related to transportation and infrastructure, applications in alternative energy, high temperature thermal insulation (i.e., thermal shielding) applications (due to higher strength, higher modulus, higher softening temperature and higher glass transition temperature). In some embodiments, a composite may have sheet-like physical dimensions or shape, and may be a panel.

Some embodiments of the present invention relate to prepregs. In some embodiments, a prepreg may comprise a plurality of glass fibers from a glass composition described herein. For example, in some embodiments, a prepreg may comprise a polymeric material and a plurality of glass fibers formed from the glass composition comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $Y_2O_3$ up to 12 weight percent, $CeO_2$ up to 6 weight percent, ZnO up to 4 weight percent, $Li_2O$ less than 1 weight percent, and $B_2O_3$ less than 4.5 weight percent. In some embodiments, the a ratio of CaO to MgO (CaO/MgO) of the composition may be less than about 2.0. In some cases, the composition may be substantially free of $SO_3$. In some embodiments, the plurality of glass fibers may be in the form of a non-woven fabric or a unidirectional fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

While many of the applications for the glass fibers described herein are reinforcement applications, some embodiments of glass fibers may be utilized in electronics applications such as printed circuit boards ("PCB").

More particularly, some embodiments relate to glass fiber reinforcements that have electrical properties that permit enhancing performance of a PCB. For example, some embodiments may have a dielectric constant (Dk) desirable for electronics applications. The dielectric constant of a material (Dk), also known as "permittivity," is a measure of the ability of a material to store electric energy. A material to be used as a capacitor desirably has a relatively high Dk, whereas a material to be used as part of a PCB substrate desirably has a low Dk, particularly for high speed circuits. Dk is the ratio of the charge that would be stored (i.e., the capacitance) of a given material between two metal plates to the amount of charge that would be stored by a void (air or vacuum) between the same two metal plates. As another example, some embodiments may have a coefficient for thermal expansion desirable for electronics applications. Accordingly, some embodiments may be used in a variety of electrical applications including, without limitation, printed circuit boards, precursors to printed circuit boards (e.g., fabrics, laminates, prepregs, etc.). In such embodiments, the printed circuit board or other composite to be used in electrical applications can comprise a polymeric resin and a plurality of glass fibers in contact with the polymeric resin, wherein at least one of the plurality of glass fibers was formed from any of the glass compositions disclosed herein as part of the present invention. The polymeric resin can include any of those known to those of skill in the art for use in printed circuit boards or other electrical applications.

Turning now to methods of manufacturing glass fibers of the present invention and related products, glass fibers of the present invention can be prepared in the conventional manner well known in the art, by blending the raw materials used to supply the specific oxides that form the composition of the fibers. Glass fibers according to the various embodiments of the present invention can be formed using any process known in the art for forming glass fibers, and more desirably, any process known in the art for forming essentially continuous glass fibers. For example, although not limiting herein, the glass fibers according to non-limiting embodiments of the present invention can be formed using direct-melt or indirect-melt fiber forming methods. These methods are well known in the art and further discussion thereof is not believed to be necessary in view of the present disclosure. See, e.g., K. L. Loewenstein, The Manufacturing Technology of Continuous Glass Fibers, 3rd Ed., Elsevier, N.Y., 1993 at pages 47-48 and 117-234.

Following formation of the glass fibers, a primary sizing composition can be applied to the glass fibers using any suitable method known to one of ordinary skill in the art. One skilled in the art may choose one of many commercially available sizing compositions for the glass fibers based upon a number of factors including, for example, performance properties of the sizing compositions, desired flexibility of the resulting fabric, cost, and other factors.

Fiber glass strands of the present invention can be prepared by any suitable method known to one of ordinary skill in the art. Glass fiber fabrics of the present invention can generally be made by any suitable method known to one of ordinary skill in the art, such as but not limited to interweaving weft yarns (also referred to as "fill yarns") into a plurality of warp yarns.

Composites of the present invention can be prepared by any suitable method known to one of ordinary skill in the art, such as, but not limited to, vacuum assisted resin infusion molding, extrusion compounding, compression molding, resin transfer molding, filament winding, prepreg/autoclave curing, and pultrusion. Composites of the present invention can be prepared using such molding techniques as known to those of ordinary skill in the art. In particular, embodiments of composites of the present invention that incorporate woven fiber glass fabrics can be prepared using techniques known to those of skill in the art for preparation of such composites.

Prepregs of the present invention can be prepared by any suitable means known to one of ordinary skill in the art, such as but not limited to passing fiber glass strands, rovings, or fabrics through a resin bath; using a solvent-based resin; or using a resin film.

As noted above, composites of the present invention can comprise a polymeric resin, in some embodiments. A variety of polymeric resins may be used. Polymeric resins that are known to be useful in reinforcement applications can be particularly useful in some embodiments. In some embodiments, the polymeric resin may comprise a thermoset resin. Thermoset resin systems useful in some embodiments of the present invention may include, but are not limited to, epoxy resin systems, phenolic based resins, polyesters, vinyl esters, thermoset polyurethanes, polydicyclopentadiene (pDCPD) resins, cyanate esters, and bis-maleimides. In some embodiments, the polymeric resin can comprise an epoxy resin. In other embodiments, the polymeric resin can comprise a thermoplastic resin. Thermoplastic polymers useful in some embodiments of the present invention include, but are not limited to, polyethylene, polypropylene, polyamides (including Nylon), polybutylene terephthalate, polycarbonate, thermoplastic polyurethanes (TPU), polyphenylene sulfides, and polyether ether keteone (PEEK). Non-limiting examples of commercially available polymeric resins useful in some embodiments of the present invention include EPIKOTE Resin MGS® RIMR 135 epoxy with Epikure MGS RIMH 1366 curing agent (available from Momentive Specialty Chemicals Inc. of Columbus, Ohio), Applied Poleramic MMFCS2 epoxy (available from Applied Poleramic, Inc., Benicia, California), and EP255 modified epoxy (available from Barrday Composite Solutions, Millbury, MA).

The invention will be illustrated through the following series of specific embodiments. However, it will be understood by one of skill in the art that many other embodiments are contemplated by the principles of the invention.

Examples

Table 1 provides a plurality of fiberizable glass compositions according to various embodiments of the present invention as well as data relating to various properties of such compositions. The glasses in these examples were made by melting mixtures of commercial and reagent grade chemicals (reagent grade chemicals were used only for the rare earth oxides) in powder form in 10% Rh/Pt crucibles at the temperatures between 1500° C. and 1600° C. (2732° F. to 2912° F.) for four hours. Each batch was about 1000 grams. After the 4 hour melting period, the molten glass was poured onto a steel plate for quenching. Volatile species, such as alkali oxides from impurities in ingredients used, were not adjusted in the batches for their emission loss because of their low concentrations in the glasses. The compositions in the Examples represent as-batched compositions. Commercial ingredients were used in preparing the glasses. In the batch calculation, special raw material retention factors were considered to calculate the oxides in each glass. The retention factors are based on years of glass batch melting and oxides yield in the glass as measured. Hence, the as-batched compositions illustrated in the examples are considered to be close to the measured compositions.

Melt Properties

Melt viscosity as a function of temperature and liquidus temperature was determined by using ASTM Test Method C965 "Standard Practice for Measuring Viscosity of Glass Above the Softening Point," and C829 "Standard Practices for Measurement of Liquidus Temperature of Glass by the Gradient Furnace Method," respectively.

Table 1 includes measured liquidus temperature ($T_L$), reference temperature of forming ($T_F$) defined by melt viscosity of 1000 Poise for the glass compositions. The difference between the forming temperature and the liquidus temperature ($\Delta T$) is also shown.

Mechanical Properties

Young's modulus (or sonic modulus) of a fiber was also measured for certain glass compositions in Table 1 using the following technique. Approximately 50 grams of glass cullet having a composition corresponding to the appropriate example Table 1 was re-melted in a 90 Pt/10 Rh crucible for two hours at a melting temperature defined by 100 Poise. The crucible was subsequently transferred into a vertical tube, electrically heated furnace. The furnace temperature was preset at a fiber pulling temperature close or equal to a 1000 Poise melt viscosity. The glass was equilibrated at the temperature for one hour before fiber drawing. The top of the fiber drawing furnace had a cover with a center hole, above which a water-cooled copper coil was mounted to regulate the fiber cooling. A silica rod was then manually dipped into the melt through the cooling coil, and a fiber about 1-1.5 m long was drawn out and collected. The diameter of the fiber ranged from about 100 μm at one end to about 1000 μm at the other end; over the range the sonic modulus value is independent of fiber diameter. The specific modulus is calculated by the ratio of the measured sonic modulus and bare fiber density. The fiber sonic modulus measurement follows the method by L. C. Lynnworth, "Ultrasonic Measurement of Elastic Moduli in Slender Specimens Using Extensional and Torsional Wave Pulses," Journal of Testing and Evaluation, JTEVA, Vol. 1, No. 2, March 1973, pp. 119-125.

TABLE 1

| | 1 | 2 | 3 | 4 | 5 | 6 | 7 | 8 |
|---|---|---|---|---|---|---|---|---|
| $SiO_2$ | 60.45 | 60.57 | 60.70 | 60.33 | 60.32 | 60.83 | 61.05 | 61.31 |
| $Al_2O_3$ | 15.42 | 15.45 | 15.49 | 14.56 | 14.60 | 15.23 | 15.50 | 16.00 |
| $Fe_2O_3$ | 0.29 | 0.29 | 0.29 | 0.29 | 0.30 | 0.37 | 0.27 | 0.28 |
| CaO | 14.46 | 14.49 | 14.52 | 15.04 | 15.30 | 7.90 | 7.50 | 7.00 |
| MgO | 8.15 | 8.17 | 8.20 | 8.21 | 8.43 | 8.86 | 9.52 | 9.27 |
| $Na_2O$ | 0.07 | 0.07 | 0.07 | 0.08 | 0.08 | 0.04 | 0.14 | 0.14 |
| $K_2O$ | 0.09 | 0.09 | 0.09 | 0.09 | 0.09 | 0.09 | 0.08 | 0.09 |
| $Y_2O_3$ | 0.00 | 0.00 | 0.00 | 0.54 | 0.00 | 4.50 | 5.00 | 4.96 |
| $F_2$ | 0.01 | 0.01 | 0.01 | 0.02 | 0.02 | 0.00 | 0.01 | 0.01 |
| $TiO_2$ | 0.62 | 0.62 | 0.62 | 0.51 | 0.54 | 1.41 | 0.63 | 0.65 |
| $Li_2O$ | 0.43 | 0.22 | 0.00 | 0.00 | 0.00 | 0.77 | 0.00 | 0.00 |
| $B_2O_3$ | 0.00 | 0.00 | 0.00 | 0.00 | 0.00 | 0.00 | 0.00 | 0.00 |
| $SO_3$ | 0.00 | 0.00 | 0.00 | 0.00 | 0.00 | 0.00 | 0.00 | 0.00 |
| $CeO_2$ | 0.00 | 0.00 | 0.00 | 0.32 | 0.32 | 0.00 | 0.30 | 0.30 |
| Total $RE_2O_3$ | 0.00 | 0.00 | 0.00 | 0.85 | 0.32 | 4.50 | 5.30 | 5.26 |
| CaO/MgO | 1.77 | 1.77 | 1.77 | 1.83 | 1.81 | 0.89 | 0.79 | 0.76 |
| $Al_2O_3$/RO | 0.68 | 0.68 | 0.68 | 0.63 | 0.62 | 0.91 | 0.91 | 0.98 |
| $SiO_2 + Al_2O_3$ | 75.87 | 76.03 | 76.19 | 74.89 | 74.92 | 76.05 | 76.55 | 77.31 |
| $RE_2O_3$/MgO | 0.00 | 0.00 | 0.00 | 0.10 | 0.04 | 0.51 | 0.56 | 0.57 |
| MgO + CaO | 22.62 | 22.67 | 22.72 | 23.25 | 23.73 | 16.76 | 17.01 | 16.27 |
| $T_L$ (° C.) | 1204 | 1199 | 1219 | 1218 | 1209 | 1219 | 1295 | 1309 |
| $T_F$ (° C.) | 1281 | 1291 | 1299 | 1278 | 1272 | 1289 | | |
| $\Delta T$ (° C.) | 77 | 92 | 80 | 60 | 63 | 70 | | |
| $T_M$ (° C.) | 1475 | 1482 | 1489 | 1452 | 1446 | 1491 | | |
| Fiber density (g/cm³) | 2.62 | 2.62 | 2.62 | 2.61 | 2.64 | 2.64 | 2.64 | 2.64 |
| Fiber modulus (GPa) | 90.4 | 90.1 | 88.8 | 88.5 | 88.8 | 91.8 | 90.2 | 90.6 |
| Sp. Modulus ($10^6$ m) | 3.52 | 3.51 | 3.46 | 3.46 | 3.44 | 3.54 | 3.49 | 3.51 |

| | 9 | 10 | 11 | 12 | 13 | 14 | 15 | 16 |
|---|---|---|---|---|---|---|---|---|
| $SiO_2$ | 61.50 | 63.04 | 62.52 | 61.69 | 61.30 | 59.74 | 60.17 | 60.41 |
| $Al_2O_3$ | 16.05 | 15.98 | 15.85 | 16.64 | 16.53 | 18.21 | 18.14 | 16.35 |
| $Fe_2O_3$ | 0.28 | 0.28 | 0.28 | 0.28 | 0.28 | 0.31 | 0.31 | 0.28 |
| CaO | 7.00 | 6.64 | 6.43 | 4.66 | 5.78 | 5.60 | 5.39 | 6.16 |
| MgO | 9.29 | 9.03 | 8.50 | 10.18 | 9.59 | 10.48 | 10.32 | 9.99 |
| $Na_2O$ | 0.14 | 0.30 | 0.30 | 0.04 | 0.04 | 0.04 | 0.04 | 0.03 |
| $K_2O$ | 0.09 | 0.09 | 0.09 | 0.09 | 0.09 | 0.10 | 0.10 | 0.09 |

TABLE 1-continued

| | | | | | | | | |
|---|---|---|---|---|---|---|---|---|
| $Y_2O_3$ | 4.00 | 3.48 | 4.90 | 5.44 | 5.41 | 4.50 | 4.51 | 5.21 |
| $F_2$ | 0.01 | 0.01 | 0.01 | 0.01 | 0.01 | 0.01 | 0.01 | 0.01 |
| $TiO_2$ | 0.65 | 0.65 | 0.64 | 0.67 | 0.67 | 0.73 | 0.73 | 0.66 |
| $Li_2O$ | 0.00 | 0.00 | 0.00 | 0.00 | 0.00 | 0.00 | 0.00 | 0.54 |
| $B_2O_3$ | 0.00 | 0.00 | 0.00 | 0.00 | 0.00 | 0.00 | 0.00 | 0.00 |
| $SO_3$ | 0.00 | 0.00 | 0.00 | 0.00 | 0.00 | 0.00 | 0.00 | 0.00 |
| $CeO_2$ | 1.00 | 0.50 | 0.50 | 0.29 | 0.29 | 0.28 | 0.28 | 0.26 |
| Total $RE_2O_3$ | 5.00 | 3.98 | 5.39 | 5.74 | 5.70 | 4.79 | 4.79 | 5.47 |
| CaO/MgO | 0.75 | 0.74 | 0.76 | 0.46 | 0.60 | 0.53 | 0.52 | 0.62 |
| $Al_2O_3$/RO | 0.99 | 1.02 | 1.06 | 1.12 | 1.08 | 1.13 | 1.15 | 1.01 |
| $SiO_2 + Al_2O_3$ | 77.54 | 79.02 | 78.37 | 78.33 | 77.84 | 77.95 | 78.31 | 76.76 |
| $RE_2O_3$/MgO | 0.54 | 0.44 | 0.63 | 0.56 | 0.59 | 0.46 | 0.46 | 0.55 |
| MgO + CaO | 16.29 | 15.67 | 14.93 | 14.84 | 15.37 | 16.08 | 15.71 | 16.14 |
| $T_L$ (° C.) | 1306 | 1297 | 1300 | 1356 | 1336 | 1296 | 1289 | 1305 |
| $T_F$ (° C.) | | | | | | 1327 | 1315 | |
| $\Delta T$ (° C.) | | | | | | 31 | 26 | |
| $T_M$ (° C.) | | | | | | 1507 | 1510 | |
| Fiber density (g/cm³) | 2.63 | 2.60 | 2.65 | 2.63 | 2.64 | 2.64 | 2.64 | 2.64 |
| Fiber modulus (GPa) | 90.1 | 89.3 | 90.2 | 91.3 | 90.3 | 91.2 | 91.8 | 91.4 |
| Sp. Modulus (10⁶ m) | 3.49 | 3.51 | 3.47 | 3.54 | 3.49 | 3.52 | 3.55 | 3.53 |

| | 17 | 18 | 19 | 20 | 21 | 22 | 23 | 24 |
|---|---|---|---|---|---|---|---|---|
| $SiO_2$ | 60.03 | 59.30 | 59.71 | 60.46 | 60.89 | 60.81 | 60.65 | 61.00 |
| $Al_2O_3$ | 16.99 | 18.60 | 18.73 | 14.37 | 14.06 | 14.16 | 13.74 | 19.13 |
| $Fe_2O_3$ | 0.29 | 0.32 | 0.32 | 0.26 | 0.26 | 0.26 | 0.25 | 0.32 |
| CaO | 6.40 | 6.70 | 6.74 | 7.02 | 6.84 | 6.78 | 6.87 | 6.87 |
| MgO | 10.38 | 9.90 | 9.34 | 12.31 | 12.50 | 12.53 | 12.76 | 8.04 |
| $Na_2O$ | 0.03 | 0.23 | 0.61 | 0.03 | 0.03 | 0.03 | 0.03 | 0.62 |
| $K_2O$ | 0.09 | 0.10 | 0.10 | 0.08 | 0.08 | 0.08 | 0.08 | 0.10 |
| $Y_2O_3$ | 4.26 | 3.89 | 3.50 | 4.57 | 4.50 | 4.48 | 4.56 | 2.94 |
| $F_2$ | 0.01 | 0.01 | 0.01 | 0.01 | 0.01 | 0.01 | 0.01 | 0.01 |
| $TiO_2$ | 0.68 | 0.75 | 0.75 | 0.58 | 0.57 | 0.57 | 0.56 | 0.77 |
| $Li_2O$ | 0.57 | 0.00 | 0.00 | 0.00 | 0.00 | 0.00 | 0.15 | 0.00 |
| $B_2O_3$ | 0.00 | 0.00 | 0.00 | 0.00 | 0.00 | 0.00 | 0.00 | 0.00 |
| $SO_3$ | 0.00 | 0.00 | 0.00 | 0.00 | 0.00 | 0.00 | 0.00 | 0.00 |
| $CeO_2$ | 0.27 | 0.19 | 0.19 | 0.30 | 0.28 | 0.28 | 0.34 | 0.20 |
| Total $RE_2O_3$ | 4.52 | 4.08 | 3.69 | 4.87 | 4.78 | 4.76 | 4.90 | 3.13 |
| CaO/MgO | 0.62 | 0.68 | 0.72 | 0.57 | 0.55 | 0.54 | 0.54 | 0.85 |
| $Al_2O_3$/RO | 1.01 | 1.12 | 1.16 | 0.74 | 0.73 | 0.73 | 0.70 | 1.28 |
| $SiO_2 + Al_2O_3$ | 77.02 | 77.91 | 78.44 | 74.83 | 74.95 | 74.97 | 74.39 | 80.13 |
| $RE_2O_3$/MgO | 0.44 | 0.41 | 0.40 | 0.40 | 0.38 | 0.38 | 0.38 | 0.39 |
| MgO + CaO | 16.78 | 16.60 | 16.08 | 19.33 | 19.33 | 19.31 | 19.63 | 14.91 |
| $T_L$ (° C.) | 1293 | 1189 | 1190 | 1315 | 1325 | 1335 | 1352 | 1269 |
| $T_F$ (° C.) | | | | | | | | |
| $\Delta T$ (° C.) | | | | | | | | |
| $T_M$ (° C.) | | | | | | | | |
| Fiber density (g/cm³) | 2.66 | 2.64 | 2.62 | 2.66 | 2.65 | 2.66 | 2.66 | 2.59 |
| Fiber modulus (GPa) | 91.4 | 90.6 | 88.7 | 92.2 | 91.8 | 91.9 | 92.2 | 89.6 |
| Sp. Modulus (10⁶ m) | 3.50 | 3.50 | 3.45 | 3.54 | 3.53 | 3.52 | 3.54 | 3.53 |

| | 25 | 26 | 27 | 28 | 29 | 30 | 31 | 32 |
|---|---|---|---|---|---|---|---|---|
| $SiO_2$ | 60.61 | 59.72 | 60.09 | 51.84 | 52.71 | 52.06 | 60.08 | 60.32 |
| $Al_2O_3$ | 19.01 | 18.53 | 18.66 | 30.27 | 17.75 | 19.79 | 18.74 | 12.00 |
| $Fe_2O_3$ | 0.32 | 0.31 | 0.32 | 0.47 | 0.31 | 0.33 | 0.32 | 0.22 |
| CaO | 6.83 | 6.17 | 6.15 | 3.78 | 7.22 | 6.84 | 5.30 | 5.30 |
| MgO | 7.99 | 8.91 | 8.80 | 6.59 | 10.29 | 9.75 | 10.45 | 9.55 |
| $Na_2O$ | 0.62 | 0.60 | 0.37 | 0.02 | 0.47 | 0.45 | 0.05 | 0.06 |
| $K_2O$ | 0.10 | 0.10 | 0.10 | 0.16 | 0.09 | 0.11 | 0.10 | 0.07 |
| $Y_2O_3$ | 3.55 | 4.71 | 4.61 | 5.64 | 10.20 | 9.65 | 3.95 | 12.00 |
| $F_2$ | 0.01 | 0.01 | 0.01 | 0.02 | 0.01 | 0.01 | 0.01 | 0.01 |
| $TiO_2$ | 0.76 | 0.74 | 0.75 | 1.20 | 0.71 | 0.79 | 0.75 | 0.49 |
| $Li_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| $SO_3$ | 0.00 | 0.00 | 0.00 | 0.00 | 0.00 | 0.00 | 0.00 | 0.00 |
| $CeO_2$ | 0.20 | 0.19 | 0.14 | 0.00 | 0.24 | 0.22 | 0.25 | 0.00 |
| Total $RE_2O_3$ | 3.75 | 4.90 | 4.75 | 5.64 | 10.44 | 9.88 | 4.19 | 12.00 |
| CaO/MgO | 0.85 | 0.69 | 0.70 | 0.57 | 0.70 | 0.70 | 0.51 | 0.56 |
| $Al_2O_3$/RO | 1.28 | 1.23 | 1.25 | 2.92 | 1.01 | 1.19 | 1.19 | 0.81 |
| $SiO_2 + Al_2O_3$ | 79.62 | 78.25 | 78.75 | 82.11 | 70.46 | 71.85 | 78.82 | 72.32 |
| $RE_2O_3$/MgO | 0.47 | 0.55 | 0.54 | 0.86 | 1.01 | 1.01 | 0.40 | 1.26 |
| MgO + CaO | 14.81 | 15.08 | 14.95 | 10.38 | 17.51 | 16.59 | 15.76 | 14.84 |
| $T_L$ (° C.) | | | | | 1190 | 1220 | 1295 | |
| $T_F$ (° C.) | | | | | | | | |
| $\Delta T$ (° C.) | | | | | | | | |
| $T_M$ (° C.) | | | | | | | | |

TABLE 1-continued

| | | | | | | | | |
|---|---|---|---|---|---|---|---|---|
| Fiber density (g/cm³) | 2.61 | 2.64 | 2.63 | 2.67 | 2.79 | 2.77 | 2.62 | 2.74 |
| Fiber modulus (GPa) | 89.8 | 89.8 | 90.6 | 97.8 | 96.2 | 95.9 | 91.38 | 92.2 |
| Sp. Modulus (10⁶ m) | 3.52 | 3.48 | 3.52 | 3.74 | 3.52 | 3.53 | 3.56 | 3.44 |

| | 33 | 34 | 35 | 36 | 37 | 38 | 39 | 40 |
|---|---|---|---|---|---|---|---|---|
| $SiO_2$ | 60.45 | 58.65 | 58.48 | 57.93 | 58.01 | 48.86 | 49.60 | 50.61 |
| $Al_2O_3$ | 12.00 | 20.22 | 20.80 | 19.45 | 19.59 | 29.65 | 29.23 | 29.82 |
| $Fe_2O_3$ | 0.22 | 0.34 | 0.34 | 0.33 | 0.33 | 0.47 | 0.46 | 0.47 |
| CaO | 6.30 | 6.14 | 5.00 | 8.94 | 6.84 | 3.50 | 3.45 | 3.50 |
| MgO | 9.95 | 9.34 | 9.30 | 8.03 | 9.40 | 12.32 | 12.14 | 10.23 |
| $Na_2O$ | 0.06 | 0.01 | 0.01 | 0.01 | 0.01 | 0.05 | 0.05 | 0.05 |
| $K_2O$ | 0.07 | 0.11 | 0.11 | 0.10 | 0.10 | 0.15 | 0.15 | 0.16 |
| $Y_2O_3$ | 10.45 | 4.07 | 4.82 | 4.14 | 4.64 | 3.49 | 3.44 | 3.65 |
| $F_2$ | 0.01 | 0.01 | 0.01 | 0.01 | 0.01 | 0.02 | 0.02 | 0.02 |
| $TiO_2$ | 0.49 | 0.81 | 0.83 | 0.78 | 0.78 | 1.18 | 1.16 | 1.18 |
| $Li_2O$ | 0.00 | 0.00 | 0.00 | 0.00 | 0.00 | 0.00 | 0.00 | 0.00 |
| $B_2O_3$ | 0.00 | | 0.00 | 0.00 | 0.00 | 0.00 | 0.00 | 0.00 |
| $SO_3$ | 0.00 | 0.00 | 0.00 | 0.00 | 0.00 | 0.00 | 0.00 | 0.00 |
| $CeO_2$ | 0.00 | 0.29 | 0.28 | 0.28 | 0.28 | 0.30 | 0.30 | 0.31 |
| Total $RE_2O_3$ | 10.45 | 4.36 | 5.10 | 4.42 | 4.91 | 3.79 | 3.74 | 3.96 |
| CaO/MgO | 0.63 | 0.66 | 0.54 | 1.11 | 0.73 | 0.28 | 0.28 | 0.34 |
| $Al_2O_3/RO$ | 0.74 | 1.31 | 1.45 | 1.15 | 1.21 | 1.87 | 1.87 | 2.17 |
| $SiO_2 + Al_2O_3$ | 72.45 | 78.88 | 79.28 | 77.37 | 77.60 | 78.52 | 78.83 | 80.43 |
| $RE_2O_3/MgO$ | 1.05 | 0.47 | 0.55 | 0.55 | 0.52 | 0.31 | 0.31 | 0.39 |
| MgO + CaO | 16.25 | 15.48 | 14.30 | 16.97 | 16.24 | 15.82 | 15.59 | 13.74 |
| $T_L$ (° C.) | | | | | | 1302 | 1303 | 1302 |
| $T_F$ (° C.) | | | | | | | | |
| $\Delta T$ (° C.) | | | | | | | | |
| $T_M$ (° C.) | | | | | | | | |
| Fiber density (g/cm³) | 2.72 | 2.62 | 2.65 | 2.65 | 2.65 | 2.67 | 2.68 | 2.67 |
| Fiber modulus (GPa) | 91.9 | 91.1 | 92.8 | 91.07 | 91.98 | 99.1 | 98.8 | 98.2 |
| Sp. Modulus (10⁶ m) | 3.44 | 3.55 | 3.58 | 3.51 | 3.54 | 3.79 | 3.75 | 3.75 |

| | 41 | 42 | 43 | 44 | 45 | 46 | 47 | 48 |
|---|---|---|---|---|---|---|---|---|
| $SiO_2$ | 50.37 | 54.12 | 49.00 | 49.00 | 59.02 | 54.07 | 52.19 | 57.55 |
| $Al_2O_3$ | 29.69 | 31.61 | 29.84 | 27.50 | 21.30 | 24.76 | 27.06 | 19.86 |
| $Fe_2O_3$ | 0.47 | 0.48 | 0.47 | 0.43 | 0.34 | 0.39 | 0.43 | 0.32 |
| CaO | 4.09 | 1.29 | 2.83 | 3.00 | 0.63 | 0.45 | 0.47 | 0.73 |
| MgO | 10.27 | 5.15 | 10.00 | 10.60 | 12.31 | 12.88 | 12.50 | 13.20 |
| $Na_2O$ | 0.05 | 0.02 | 2.69 | 0.03 | 0.24 | 0.28 | 0.31 | 0.05 |
| $K_2O$ | 0.16 | 0.17 | 0.16 | 0.17 | 0.11 | 0.13 | 0.14 | 0.11 |
| $Y_2O_3$ | 3.40 | 0.00 | 3.50 | 3.75 | 4.94 | 5.75 | 5.50 | 7.38 |
| $F_2$ | 0.02 | 0.02 | 0.02 | 0.02 | 0.02 | 0.02 | 0.02 | 0.02 |
| $TiO_2$ | 1.18 | 1.25 | 1.18 | 1.09 | 0.85 | 0.99 | 1.08 | 0.80 |
| $Li_2O$ | 0.00 | 0.00 | 0.00 | 0.00 | 0.00 | 0.00 | 0.00 | 0.00 |
| $B_2O_3$ | 0.00 | 0.00 | 0.00 | 4.40 | 0.00 | 0.00 | 0.00 | 0.00 |
| $SO_3$ | 0.00 | 0.00 | 0.00 | 0.00 | 0.00 | 0.00 | 0.00 | 0.00 |
| $CeO_2$ | 0.31 | 5.89 | 0.31 | 0.00 | 0.24 | 0.28 | 0.31 | 0.00 |
| Total $RE_2O_3$ | 3.71 | 5.89 | 3.81 | 3.75 | 5.18 | 6.03 | 5.81 | 7.38 |
| CaO/MgO | 0.40 | 0.25 | 0.28 | 0.28 | 0.05 | 0.03 | 0.04 | 0.05 |
| $Al_2O_3/RO$ | 2.07 | 4.91 | 2.33 | 2.02 | 1.65 | 1.86 | 2.09 | 1.43 |
| $SiO_2 + Al_2O_3$ | 80.06 | 85.72 | 78.84 | 76.51 | 80.32 | 78.84 | 79.25 | 77.41 |
| $RE_2O_3/MgO$ | 0.36 | 1.14 | 0.38 | 0.35 | 0.42 | 0.47 | 0.46 | 0.56 |
| MgO + CaO | 14.36 | 6.44 | 12.83 | 13.60 | 12.93 | 13.32 | 12.97 | 13.92 |
| $T_L$ (° C.) | 1306 | | 1317 | 1339 | 1289 | 1305 | 1315 | 1297 |
| $T_F$ (° C.) | | | | | | | | |
| $\Delta T$ (° C.) | | | | | | | | |
| $T_M$ (° C.) | | | | | | | | |
| Fiber density (g/cm³) | 2.66 | 2.64 | 2.66 | 2.64 | 2.63 | 2.69 | 2.69 | 2.68 |
| Fiber modulus (GPa) | 98.3 | 95.5 | 94.9 | 95.5 | 95.1 | 100.0 | 99.0 | 96.3 |
| Sp. Modulus (10⁶ m) | 3.77 | 3.68 | 3.64 | 36.91 | 3.69 | 3.80 | 3.76 | 3.67 |

| | 49 | 50 | 51 | 52 | 53 | 54 | 55 | 56 | 57 |
|---|---|---|---|---|---|---|---|---|---|
| $SiO_2$ | 56.51 | 56.96 | 56.18 | 54.93 | 54.56 | 54.84 | 55.2 | 52.51 | 52.13 |
| $Al_2O_3$ | 20.86 | 23.62 | 23.56 | 23.19 | 23.23 | 23.87 | 23.61 | 25.89 | 27.00 |
| $Fe_2O_3$ | 0.34 | 0.37 | 0.37 | 0.39 | 0.39 | 0.39 | 0.39 | 0.40 | 0.40 |
| CaO | 0.71 | 0.75 | 0.79 | 0.66 | 0.38 | 0.44 | 0.45 | 0.97 | 0.20 |
| MgO | 13.52 | 10.52 | 10.76 | 10.84 | 10.95 | 10.76 | 10.63 | 8.29 | 8.72 |
| $Na_2O$ | 0.04 | 0.10 | 0.10 | 0.10 | 0.10 | 0.10 | 0.10 | 0.10 | 0.10 |
| $K_2O$ | 0.11 | 0.13 | 0.12 | 0.10 | 0.10 | 0.10 | 0.10 | 0.14 | 0.14 |
| $Y_2O_3$ | 7.06 | 6.35 | 6.91 | 8.56 | 9.07 | 8.28 | 8.29 | 10.46 | 10.00 |
| $F_2$ | 0.02 | 0.02 | 0.02 | 0.01 | 0.01 | 0.01 | 0.01 | 0.02 | 0.02 |
| $TiO_2$ | 0.83 | 0.94 | 0.94 | 0.90 | 0.90 | 0.90 | 0.90 | 1.03 | 1.10 |
| $Li_2O$ | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 | 0.00 |
| $SO_3$ | 0.00 | 0.00 | 0.00 | 0.01 | 0.01 | 0.01 | 0.01 | 0.01 | 0.01 |
| $CeO_2$ | 0.00 | 0.24 | 0.24 | 0.30 | 0.30 | 0.30 | 0.30 | 0.19 | 0.19 |

TABLE 1-continued

| | | | | | | | | | |
|---|---|---|---|---|---|---|---|---|---|
| Total RE$_2$O$_3$ | 7.06 | 6.59 | 7.16 | 8.86 | 9.37 | 8.58 | 8.59 | 10.65 | 10.19 |
| CaO/MgO | 0.05 | 0.07 | 0.07 | 0.06 | 0.03 | 0.04 | 0.04 | 0.12 | 0.02 |
| Al$_2$O$_3$/RO | 1.47 | 2.10 | 2.04 | 2.02 | 2.05 | 2.13 | 2.13 | 2.79 | 3.03 |
| SiO$_2$ + Al$_2$O$_3$ | 77.37 | 80.58 | 79.74 | 78.12 | 77.79 | 78.71 | 78.81 | 78.40 | 79.13 |
| RE$_2$O$_3$/MgO | 0.52 | 0.63 | 0.67 | 0.82 | 0.86 | 0.80 | 0.81 | 1.28 | 1.17 |
| MgO + CaO | 14.22 | 11.27 | 11.55 | 11.50 | 11.33 | 11.20 | 11.08 | 9.26 | 8.92 |
| T$_L$ (° C.) | | | | | | | | | |
| T$_F$ (° C.) | | | | | | | | | |
| ΔT (° C.) | | | | | | | | | |
| T$_M$ (° C.) | | | | | | | | | |
| Fiber density (g/cm$^3$) | 2.68 | 2.649 | 2.668 | 2.708 | 2.713 | 2.702 | 2.700 | 2.743 | 2.705 |
| Fiber modulus (GPa) | 97.2 | 96.2 | 97.5 | 98.1 | 97.5 | 98.1 | 98.1 | 98.93 | 98.00 |
| Sp. Modulus (10$^6$ m) | 3.70 | 3.71 | 3.73 | 36.97 | 36.67 | 37.05 | 3.71 | 3.68 | 36.97 |

| | 58 | 59 | 60 | 61 | 62 | 63 | 64 | 65 | 66 |
|---|---|---|---|---|---|---|---|---|---|
| SiO$_2$ | 54.58 | 53.57 | 54.58 | 53.58 | 55.07 | 53.43 | 52.57 | 52.55 | 50.05 |
| Al$_2$O$_3$ | 24.77 | 25.26 | 24.76 | 25.24 | 24.51 | 25.24 | 26.75 | 26.26 | 24.76 |
| Fe$_2$O$_3$ | 0.39 | 0.40 | 0.39 | 0.40 | 0.39 | 0.40 | 0.42 | 0.42 | 0.39 |
| CaO | 0.46 | 0.45 | 0.45 | 0.45 | 0.45 | 0.46 | 0.91 | 0.90 | 3.00 |
| MgO | 12.38 | 12.88 | 12.65 | 12.87 | 12.14 | 12.88 | 12.32 | 12.87 | 14.88 |
| Na$_2$O | 0.28 | 0.28 | 0.28 | 0.28 | 0.28 | 0.28 | 0.28 | 0.29 | 0.28 |
| K$_2$O | 0.13 | 0.13 | 0.13 | 0.13 | 0.13 | 0.13 | 0.14 | 0.14 | 0.13 |
| Y$_2$O$_3$ | 5.74 | 5.75 | 5.75 | 6.03 | 6.05 | 6.00 | 5.53 | 5.52 | 5.50 |
| F$_2$ | 0.02 | 0.02 | 0.02 | 0.02 | 0.02 | 0.02 | 0.02 | 0.02 | 0.02 |
| TiO$_2$ | 0.99 | 1.01 | 0.99 | 1.01 | 0.98 | 1.01 | 1.06 | 1.04 | 0.99 |
| Li$_2$O | 0.00 | 0.00 | 0.00 | 0.00 | 0.00 | 0.00 | 0.00 | 0.00 | 0.00 |
| B$_2$O$_3$ | 0.00 | 0.00 | 0.00 | 0.00 | 0.00 | 0.00 | 0.00 | 0.00 | 0.00 |
| SO$_3$ | 0.01 | 0.01 | 0.01 | 0.01 | 0.01 | 0.01 | 0.01 | 0.01 | 0.00 |
| CeO$_2$ | 0.27 | 0.27 | 0.00 | 0.00 | 0.00 | 0.15 | 0.00 | 0.00 | 0.00 |
| Total RE$_2$O$_3$ | 6.01 | 6.02 | 5.75 | 6.03 | 6.05 | 6.14 | 5.53 | 5.52 | 5.50 |
| CaO/MgO | 0.04 | 0.04 | 0.04 | 0.03 | 0.04 | 0.04 | 0.07 | 0.07 | 0.20 |
| Al$_2$O$_3$/RO | 1.93 | 1.89 | 1.89 | 1.90 | 1.95 | 1.89 | 2.02 | 1.91 | 1.38 |
| SiO$_2$ + Al$_2$O$_3$ | 79.35 | 78.82 | 79.34 | 78.82 | 79.57 | 78.68 | 79.32 | 78.81 | 74.81 |
| RE$_2$O$_3$/MgO | 0.48 | 0.47 | 0.45 | 0.47 | 0.50 | 0.48 | 0.45 | 0.43 | 0.37 |
| MgO + CaO | 12.84 | 13.33 | 13.10 | 13.32 | 12.59 | 13.34 | 13.23 | 13.77 | 17.88 |
| T$_L$ (° C.) | 1315 | 1295 | 1307 | 1301 | | 1314 | 1309 | 1307 | 1375 |
| T$_F$ (° C.) | | | | 1300 | | | 1294 | 1287 | 1241 |
| ΔT (° C.) | | | | −1 | | | −15 | −20 | −134 |
| T$_M$ (° C.) | | | | 1470 | | | 1460 | 1451 | 1395 |
| Fiber density (g/cm$^3$) | 2.675 | 2.689 | 2.674 | 2.690 | 2.761 | 2.699 | 2.685 | 2.695 | 2.739 |
| Fiber modulus (GPa) | 97.5 | 97.4 | 97.5 | 98.2 | 97.1 | 97.5 | 99.3 | 99.1 | 100.0 |
| Sp. Modulus (10$^6$ m) | 3.72 | 3.70 | 3.72 | 3.73 | 3.59 | 3.69 | 3.77 | 3.75 | 3.73 |

| | 67 | 68 | 69 | 70 | 71 | 72 | 73 | 74 | 75 |
|---|---|---|---|---|---|---|---|---|---|
| SiO$_2$ | 49.55 | 49.66 | 49.24 | 50.74 | 49.74 | 48.71 | 46.71 | 44.71 | 50.12 |
| Al$_2$O$_3$ | 25.76 | 25.76 | 25.00 | 23.5 | 23.5 | 23.5 | 25.5 | 25.5 | 25.50 |
| Fe$_2$O$_3$ | 0.39 | 0.50 | 0.70 | 0.6 | 0.6 | 0.4 | 0.4 | 0.4 | 0.42 |
| CaO | 3.00 | 2.78 | 3.76 | 1.86 | 0.86 | 1.06 | 3.06 | 3.06 | 3.77 |
| MgO | 14.88 | 14.88 | 14.88 | 17.88 | 18.88 | 19.88 | 19.88 | 21.88 | 15.53 |
| Na$_2$O | 0.28 | 0.28 | 0.28 | 0.28 | 0.28 | 0.28 | 0.28 | 0.28 | 0.01 |
| K$_2$O | 0.13 | 0.13 | 0.13 | 0.13 | 0.13 | 0.13 | 0.13 | 0.13 | 0.13 |
| Y$_2$O$_3$ | 5.00 | 5.00 | 5.00 | 4.00 | 5.00 | 5.00 | 3.00 | 3.00 | 3.50 |
| F$_2$ | 0.02 | 0.02 | 0.02 | 0.02 | 0.02 | 0.02 | 0.02 | 0.02 | 0.02 |
| TiO$_2$ | 0.99 | 0.99 | 0.99 | 0.99 | 0.99 | 1.02 | 1.02 | 1.02 | 1.01 |
| Li$_2$O | 0.00 | 0.00 | 0.00 | 0.00 | 0.00 | 0.00 | 0.00 | 0.00 | 0.00 |
| B$_2$O$_3$ | 0.00 | 0.00 | 0.00 | 0.00 | 0.00 | 0.00 | 0.00 | 0.00 | 0.00 |
| SO$_3$ | 0.00 | 0.00 | 0.00 | 0.00 | 0.00 | 0.00 | 0.00 | 0.00 | 0.01 |
| CeO$_2$ | 0.00 | 0.00 | 0.00 | 0.00 | 0.00 | 0.00 | 0.00 | 0.00 | 0.00 |
| Total RE$_2$O$_3$ | 5.00 | 5.00 | 5.00 | 4.00 | 5.00 | 5.00 | 3.00 | 3.00 | 3.50 |
| CaO/MgO | 0.20 | 0.19 | 0.25 | 0.10 | 0.05 | 0.05 | 0.15 | 0.14 | 0.24 |
| Al$_2$O$_3$/RO | 1.44 | 1.46 | 1.34 | 1.19 | 1.19 | 1.12 | 1.11 | 1.02 | 1.32 |
| SiO$_2$ + Al$_2$O$_3$ | 75.31 | 75.42 | 74.24 | 74.24 | 73.24 | 72.21 | 72.21 | 70.21 | 75.61 |
| RE$_2$O$_3$/MgO | 0.34 | 0.34 | 0.34 | 0.22 | 0.26 | 0.25 | 0.15 | 0.14 | 0.23 |
| MgO + CaO | 17.88 | 17.66 | 18.64 | 19.74 | 19.74 | 20.94 | 22.94 | 24.94 | 19.30 |
| T$_L$ (° C.) | 1376 | 1379 | 1365 | 1366 | 1272 | 1275 | 1315 | 1356 | 1283 |
| T$_F$ (° C.) | 1244 | | | 1223 | | 1203 | | 1217 | |
| ΔT (° C.) | −134 | | | −143 | | | | | |
| T$_M$ (° C.) | 1396 | | | 1374 | | 1344 | | 1328 | |
| Fiber density (g/cm$^3$) | 2.741 | 2.737 | 2.748 | 2.732 | 2.758 | 2.760 | 2.763 | 2.783 | 2.713 |
| Fiber modulus (GPa) | 100.9 | 100.2 | 100.4 | 99.8 | 101.7 | 103.6 | 104.5 | 106.0 | 101.0 |
| Sp. Modulus (10$^6$ m) | 3.76 | 3.74 | 3.73 | 3.73 | 3.76 | 3.83 | 3.86 | 3.89 | 3.80 |

| | 76 | 77 | 78 | 79 | 80 | 81 | 82 | 83 | 84 |
|---|---|---|---|---|---|---|---|---|---|
| SiO$_2$ | 51.38 | 50.04 | 51.55 | 50.55 | 50.00 | 50.71 | 50.06 | 49.67 | 50.06 |
| Al$_2$O$_3$ | 25.50 | 25.95 | 26.29 | 26.28 | 24.65 | 25.73 | 24.51 | 22.86 | 23.07 |
| Fe$_2$O$_3$ | 0.41 | 0.42 | 0.42 | 0.42 | 0.40 | 0.42 | 0.41 | 0.38 | 0.38 |
| CaO | 2.59 | 2.57 | 0.91 | 0.91 | 0.95 | 2.58 | 1.83 | 2.12 | 2.00 |

TABLE 1-continued

| | | | | | | | | | |
|---|---|---|---|---|---|---|---|---|---|
| MgO | 15.55 | 16.48 | 13.12 | 13.12 | 16.30 | 16.02 | 17.73 | 18.76 | 19.21 |
| $Na_2O$ | 0.01 | 0.01 | 0.02 | 0.02 | 0.01 | 0.01 | 0.15 | 1.00 | 1.01 |
| $K_2O$ | 0.13 | 0.14 | 0.14 | 0.14 | 0.13 | 0.14 | 0.13 | 0.13 | 0.13 |
| $Y_2O_3$ | 3.38 | 3.34 | 4.50 | 4.50 | 2.57 | 3.36 | 4.19 | 1.20 | 1.21 |
| $F_2$ | 0.02 | 0.02 | 0.02 | 0.02 | 0.02 | 0.02 | 0.02 | 0.02 | 0.02 |
| $TiO_2$ | 1.01 | 1.03 | 1.05 | 1.04 | 0.98 | 1.02 | 0.97 | 0.91 | 0.92 |
| $Li_2O$ | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 2.94 | 1.99 |
| $SO_3$ | 0.01 | 0.01 | 0.01 | 0.01 | 0.01 | 0.01 | 0.01 | 0.00 | 0.00 |
| $CeO_2$ | 0.00 | 0.00 | 0.00 | 0.00 | 0.00 | 0.00 | 0.00 | 0.00 | 0.00 |
| ZnO | 0.00 | 0.00 | 2.00 | 3.00 | 4.00 | 0.00 | 0.00 | 0.00 | 0.00 |
| Total $RE_2O_3$ | 3.38 | 3.34 | 4.50 | 4.50 | 2.57 | 3.36 | 4.19 | 1.20 | 1.21 |
| CaO/MgO | 0.17 | 0.16 | 0.07 | 0.07 | 0.06 | 0.16 | 0.10 | 0.11 | 0.10 |
| $Al_2O_3$/RO | 1.41 | 1.36 | 1.87 | 1.87 | 1.43 | 1.38 | 1.25 | 1.09 | 1.09 |
| $SiO_2 + Al_2O_3$ | 76.88 | 75.99 | 77.84 | 76.84 | 74.65 | 76.43 | 74.57 | 72.53 | 73.13 |
| $RE_2O_3$/MgO | 0.22 | 0.20 | 0.34 | 0.34 | 0.16 | 0.21 | 0.24 | 0.06 | 0.06 |
| MgO + CaO | 18.15 | 19.05 | 14.03 | 14.03 | 17.25 | 18.60 | 19.56 | 20.88 | 21.21 |
| $T_L$ (° C.) | 1306 | 1298 | 1303 | 1305 | | 1302 | 1291 | | |
| $T_F$ (° C.) | | | | | | | | | |
| $\Delta T$ (° C.) | | | | | | | | | |
| $T_M$ (° C.) | | | | | | | | | |
| Fiber density (g/cm³) | 2.690 | 2.712 | 2.718 | 2.737 | 2.752 | 2.701 | 2.725 | 2.667 | 2.672 |
| Fiber modulus (GPa) | 99.8 | 101.8 | 100.5 | 100.7 | 100.8 | 100.8 | 101.7 | 98.2 | 98.4 |
| Sp. Modulus ($10^6$ m) | 3.78 | 3.83 | 3.78 | 3.75 | 3.74 | 3.81 | 3.81 | 3.76 | 3.76 |

| | 85 | 86 | 87 | 88 | 89 | 90 | 91 | 92 |
|---|---|---|---|---|---|---|---|---|
| $SiO_2$ | 50.76 | 56.40 | 50.21 | 56.40 | 55.89 | 55.57 | 54.22 | 60.45 |
| $Al_2O_3$ | 23.42 | 21.40 | 25.36 | 21.44 | 21.41 | 21.30 | 21.43 | 25.82 |
| $Fe_2O_3$ | 0.38 | 0.36 | 0.41 | 0.36 | 0.36 | 0.36 | 0.37 | 0.42 |
| CaO | 1.37 | 8.28 | 2.39 | 8.31 | 8.15 | 7.98 | 8.70 | 6.61 |
| MgO | 19.47 | 11.09 | 16.54 | 11.34 | 11.95 | 11.88 | 12.07 | 5.50 |
| $Na_2O$ | 0.72 | 0.02 | 0.02 | 0.02 | 0.02 | 0.02 | 0.02 | 0.02 |
| $K_2O$ | 0.13 | 0.12 | 0.14 | 0.12 | 0.12 | 0.12 | 0.12 | 0.14 |
| $Y_2O_3$ | 1.80 | 0.00 | 2.39 | 0 | 0 | 0.88 | 0.86 | 0 |
| $F_2$ | 0.02 | 0.02 | 0.02 | 0.02 | 0.02 | 0.02 | 0.02 | 0.02 |
| $TiO_2$ | 0.93 | 0.90 | 1.01 | 0.86 | 0.86 | 0.85 | 0.85 | 1.03 |
| $Li_2O$ | 0 | 0 | 0 | 0 | 0 | 0 | 0 | 0 |
| $B_2O_3$ | 1.00 | 1.40 | 1.52 | 1.14 | 1.22 | 1.03 | 1.37 | 0.00 |
| $SO_3$ | 0.00 | 0.00 | 0.00 | 0.00 | 0.00 | 0.00 | 0.00 | 0.00 |
| $CeO_2$ | 0 | 0 | 0 | 0 | 0 | 0 | 0 | 0 |
| ZnO | 0 | 0 | 0 | 0 | 0 | 0 | 0 | 0 |
| Total $RE_2O_3$ | 1.80 | 0.00 | 2.39 | 0 | 0 | 0.88 | 0.86 | 0 |
| CaO/MgO | 0.07 | 0.75 | 0.14 | 0.73 | 0.68 | 0.67 | 0.72 | 1.20 |
| $Al_2O_3$/RO | 1.12 | 1.11 | 1.34 | 1.09 | 1.07 | 1.07 | 1.03 | 2.13 |
| $SiO_2 + Al_2O_3$ | 74.18 | 77.81 | 75.57 | 77.84 | 77.31 | 76.87 | 75.64 | 86.28 |
| $RE_2O_3$/MgO | 0.09 | 0.00 | 0.14 | 0 | 0 | 0.07 | 0.07 | 0 |
| MgO + CaO | 20.84 | 19.37 | 18.93 | 19.65 | 20.10 | 19.87 | 20.76 | 12.11 |
| $T_L$ (° C.) | | 1269 | 1370 | 1263 | 1265 | 1266 | | |
| $T_F$ (° C.) | | 1296 | | | | | | |
| $\Delta T$ (° C.) | | 27 | | | | | | |
| $T_M$ (° C.) | | 1478 | | | | | | |
| Fiber density (g/cm³) | 2.688 | 2.602 | 2.687 | 2.607 | 2.613 | 2.621 | 2.637 | 2.573 |
| Fiber modulus (GPa) | 100.2 | 92.0 | 99.12 | 92.23 | 91.22 | 91.81 | 93.28 | 90.10 |
| Sp. Modulus ($10^6$ m) | 3.80 | 3.61 | 3.76 | 3.61 | 3.56 | 3.57 | 3.61 | 3.57 |

Desirable characteristics that can be exhibited by various but not necessarily all embodiments of the present invention can include, but are not limited to, the following: the provision of glass fibers, fiber glass strands, glass fiber fabrics, prepregs, and other products useful for reinforcement applications, and others.

Illustrative Embodiments of Suitable Compositions, Fibers, Composites, Products.

As used below, any reference to compositions, composites, or products is to be understood as a reference to each of those compositions, composites, or products disjunctively (e.g., "Illustrative embodiments 1-4 is to be understood as illustrative embodiment 1, 2, 3, or 4").

Illustrative embodiment 1 is a glass composition suitable for fiber forming comprising: $SiO_2$ from about 44.5 to about 64 weight percent, $Al_2O_3$ from about 12 to about 32 weight percent, CaO from about 0.1 to about 15.5 weight percent, MgO from about 5 to about 22 weight percent, $Fe_2O_3$ less than 1 weight percent, $TiO_2$ less than 2 weight percent, $Na_2O$ less than 3 weight percent, $RE_2O_3$ up to 12 weight percent, ZnO up to 4 weight percent, $Li_2O$ less than 1 weight percent, and $B_2O_3$ less than 4.5 weight percent.

Illustrative embodiment 2 is the composition of any preceding or subsequent illustrative embodiment, wherein $RE_2O_3$ comprises at least one of $Y_2O_3$ or $CeO_2$.

Illustrative embodiment 3 is the composition illustrative embodiment 2, wherein the $CeO_2$ is up to 6 weight percent.

Illustrative embodiment 4 is the composition of any preceding or subsequent illustrative embodiment, wherein a ratio of CaO to MgO, (CaO/MgO), is less than about 2.0.

Illustrative embodiment 5 is the composition of any preceding or subsequent illustrative embodiment, wherein a total ($SiO_2 + Al_2O_3$) content is greater than about 70 weight percent.

Illustrative embodiment 6 is the composition of any preceding or subsequent illustrative embodiment, wherein a ratio of $Al_2O_3$ to RO ($Al_2O_3$/RO) is less than 5.

Illustrative embodiment 7 is the composition of any preceding or subsequent illustrative embodiment, wherein a total (MgO+CaO) content ranges from about 6 to about 25 weight percent.

Illustrative embodiment 8 is the composition of any preceding or subsequent illustrative embodiment, wherein a ratio of $RE_2O_3$ to MgO ($RE_2O_3$/MgO) is less than 1.5.

Illustrative embodiment 9 is the composition of any preceding or subsequent illustrative embodiment, wherein the composition is substantially free of $B_2O_3$.

Illustrative embodiment 10 is the composition of any preceding illustrative embodiment, wherein the composition is substantially free of $SO_3$.

Illustrative embodiment 11 is a plurality of glass fibers formed from the glass composition of any preceding or subsequent illustrative embodiment.

Illustrative embodiment 12 is the plurality of glass fibers of any preceding or subsequent illustrative embodiment, wherein the glass fibers have a Young's modulus greater than 86 GPa.

Illustrative embodiment 13 is the plurality of glass fibers of any preceding or subsequent illustrative embodiment, wherein the glass fibers have a density less than 2.8 $g/cm^3$.

Illustrative embodiment 14 is the plurality of glass fibers of any preceding or subsequent illustrative embodiment, wherein the glass fibers can be drawn at a fiber actual drawing temperature ($T_F^{actual}$) of at least 60° C. above a liquidus temperature of the glass fibers.

Illustrative embodiment 15 is the plurality of glass fibers of any preceding or subsequent illustrative embodiment, wherein the glass fibers have a liquidus temperature ($T_L$) of less than 1380° C.

Illustrative embodiment 16 is the plurality of glass fibers of any preceding or subsequent illustrative embodiment, wherein the glass fibers have a melting temperature ($T_M$) of less than 1550° C.

Illustrative embodiment 17 is the plurality of glass fibers of any preceding illustrative embodiment, wherein the glass fibers have a Specific modulus of greater than $3.2 \times 10^6$ m.

Illustrative embodiment 18 is the plurality of glass fibers of any preceding illustrative embodiment, wherein the glass fibers have a Specific modulus greater than 3.40 ($10^6$ m).

Illustrative embodiment 19 is a fiber glass strand comprising the plurality of glass fibers of any preceding illustrative embodiment.

Illustrative embodiment 20 is a roving comprising the plurality of glass fibers of any preceding illustrative embodiment.

Illustrative embodiment 21 is a yarn comprising the plurality of glass fibers of any preceding illustrative embodiment.

Illustrative embodiment 22 is a woven fabric or a unidirectional fabric comprising the plurality of glass fibers of any preceding illustrative embodiment.

Illustrative embodiment 23 is a non-woven fabric comprising the plurality of glass fibers of any preceding illustrative embodiment.

Illustrative embodiment 24 is a chopped fiber glass strand comprising the plurality of glass fibers of any preceding illustrative embodiment.

Illustrative embodiment 25 is a polymeric composite comprising: a polymeric material; and a plurality of glass fibers formed from the glass composition of any preceding illustrative embodiment.

Illustrative embodiment 26 is the polymeric composite of any preceding or subsequent illustrative embodiment, wherein the plurality of glass fibers are in the form of a non-woven fabric or a unidirectional fabric.

Illustrative embodiment 27 is the polymeric composite of any preceding or subsequent illustrative embodiment, wherein the plurality of glass fibers are in the form of a woven fabric.

Illustrative embodiment 28 is the polymeric composite of any preceding or subsequent illustrative embodiment, wherein the polymeric material comprises a thermoplastic polymer.

Illustrative embodiment 29 is the polymeric composite of any preceding or subsequent illustrative embodiment, wherein the polymeric material comprises a thermosetting polymer.

Illustrative embodiment 30 is an article of manufacture comprising a plurality of glass fibers formed from the glass composition of any preceding illustrative embodiment.

Various embodiments of the invention have been described herein. It should be recognized that these embodiments are merely illustrative of the present invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated or otherwise clearly contradicted by context.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

That which is claimed:

1. A glass composition suitable for fiber forming comprising:

$SiO_2$ from 44.5 to 64 weight percent;
$Al_2O_3$ from 12 to 32 weight percent;
CaO from 0.1 to 15.5 weight percent;
MgO from 5 to 22 weight percent;
$Fe_2O_3$ less than 1 weight percent;
$TiO_2$ less than 2 weight percent;
$Na_2O$ less than 3 weight percent;
$Li_2O$ is present up to 0.6 weight percent;
ZnO up to 4 weight percent;
one or more rare earth oxide up to 12 weight percent, wherein the one or more rare earth oxide comprises $CeO_2$;
$F_2$ is present up to 0.02 weight percent; and
$B_2O_3$ less than 4.5 weight percent.

2. The glass composition of claim 1, wherein the one or more rare earth oxide further comprises $Y_2O_3$.

3. The glass composition of claim 1, wherein a ratio of CaO to MgO, (CaO/MgO), is less than 2.0.

4. The glass composition of claim 1, wherein a total ($SiO_2$+$Al_2O_3$) content is greater than 70 weight percent.

5. The glass composition of claim 1, wherein a ratio of $Al_2O_3$ to RO ($Al_2O_3$/RO) is less than 5, wherein RO is the sum of MgO, CaO, and ZnO.

6. The glass composition of claim 1, wherein a total (MgO+CaO) content ranges from 6 to 24 weight percent.

7. The glass composition of claim 1, wherein the composition is substantially free of $B_2O_3$.

8. A plurality of glass fibers formed from the glass composition of claim 1.

9. The plurality of glass fibers of claim 8, wherein the glass fibers have a Young's modulus greater than 86 GPa.

10. The plurality of glass fibers of claim 8, wherein the glass fibers have a density less than 2.8 $g/cm^3$.

11. The plurality of glass fibers of claim 8, wherein the glass fibers can be drawn at a fiber actual drawing temperature ($T_F^{actual}$) of at least 60° C. above a liquidus temperature ($T_L$) of the glass fibers.

12. The plurality of glass fibers of claim 8, wherein the glass fibers have a Specific modulus of greater than $3.2\times10^6$ m.

13. A fiber glass strand comprising the plurality of glass fibers of claim 8.

14. A roving comprising the plurality of glass fibers of claim 8.

15. A yarn comprising the plurality of glass fibers of claim 8.

16. A woven fabric comprising the plurality of glass fibers of claim 8.

17. A non-woven fabric comprising the plurality of glass fibers of claim 8.

18. A chopped fiber glass strand comprising the plurality of glass fibers of claim 8.

19. A polymeric composite comprising:
a polymeric material; and
a plurality of glass fibers formed from the glass composition of claim 1.

20. An article of manufacture comprising a plurality of glass fibers formed from the glass composition of claim 1.

\* \* \* \* \*